US 8,045,574 B2

(12) United States Patent
Sherman et al.

(10) Patent No.: US 8,045,574 B2
(45) Date of Patent: Oct. 25, 2011

(54) CONTENTION PROTOCOLS FOR WIRELESS MEDIUM ACCESS IN COMMUNICATION NETWORKS

(75) Inventors: Matthew Sherman, Succasunna, NJ (US); David Claypool, Stevens City, VA (US); Keith Conner, Boonton, NJ (US); Phong C. Khuu, Ashburn, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 911 days.

(21) Appl. No.: 12/072,602

(22) Filed: Feb. 27, 2008

(65) Prior Publication Data

US 2009/0213815 A1    Aug. 27, 2009

(51) Int. Cl.
*H04L 12/413* (2006.01)
(52) U.S. Cl. ........................................ 370/445; 370/447
(58) Field of Classification Search .................. 370/252, 370/350, 431, 432, 442, 443, 444, 445, 447, 370/449, 458, 461, 462, 463; 709/224, 230; 455/512, 509
See application file for complete search history.

(56) References Cited

U.S. PATENT DOCUMENTS

| | | | |
|---|---|---|---|
| 4,815,071 A | 3/1989 | Shimizu | |
| 5,625,626 A * | 4/1997 | Umekita | 370/448 |
| 6,408,009 B1 | 6/2002 | Campbell et al. | |
| 7,184,393 B1 | 2/2007 | Singh et al. | |
| 7,242,694 B2 | 7/2007 | Beser | |
| 7,372,867 B2 * | 5/2008 | Ginzburg et al. | 370/447 |
| 7,680,077 B1 * | 3/2010 | Clark et al. | 370/329 |
| 2002/0163929 A1 * | 11/2002 | Li et al. | 370/448 |
| 2002/0163933 A1 * | 11/2002 | Benveniste | 370/465 |
| 2002/0188750 A1 * | 12/2002 | Li | 709/235 |
| 2004/0008627 A1 * | 1/2004 | Garg et al. | 370/235 |
| 2004/0240426 A1 * | 12/2004 | Wu et al. | 370/350 |
| 2005/0044249 A1 * | 2/2005 | Teng et al. | 709/230 |
| 2005/0063408 A1 * | 3/2005 | Famolari | 370/431 |
| 2006/0007885 A1 * | 1/2006 | Pollack et al. | 370/328 |
| 2006/0050742 A1 * | 3/2006 | Grandhi et al. | 370/506 |
| 2006/0294217 A1 * | 12/2006 | Chambers | 709/223 |
| 2007/0060158 A1 * | 3/2007 | Medepalli et al. | 455/450 |
| 2007/0115847 A1 * | 5/2007 | Strutt et al. | 370/252 |
| 2007/0230378 A1 * | 10/2007 | Tavares et al. | 370/310 |
| 2008/0107128 A1 * | 5/2008 | Lo et al. | 370/448 |

(Continued)

OTHER PUBLICATIONS

P. A. Tobagi, Multiaccess Protocols in Packet Communication Systems, IEEE Transactions on Communications, vol. COM-28, No. 4 (Apr. 1980), at pp. 468-488.

*Primary Examiner* — Aung S Moe
*Assistant Examiner* — Abdullah Riyami
(74) *Attorney, Agent, or Firm* — Leo Zucker

(57) ABSTRACT

Wireless medium access in a communication network having a number of terminals is controlled by defining protocol message units for transmission by a given terminal which units correspond to operational states of at least one of the terminal and the medium. A number of time slots are allocated for transmission of packets from each terminal, and a number of contention opportunities are defined at the beginning of each time slot. Priority and backoff mechanisms are defined and applied at each terminal during the contention opportunities in the slots. Packets are then transmitted by the terminal within the slots while (1) minimizing the occurrence of empty slots at times when packets are available for transmission, and (2) minimizing the number of slots during which two or more packets are detected on the medium simultaneously at the terminal.

25 Claims, 13 Drawing Sheets

U.S. PATENT DOCUMENTS

| | | | |
|---|---|---|---|
| 2008/0130519 A1* | 6/2008 | Bahl et al. | 370/254 |
| 2008/0212604 A1* | 9/2008 | Liu | 370/448 |
| 2008/0273549 A1* | 11/2008 | Orfanos et al. | 370/462 |
| 2009/0086706 A1* | 4/2009 | Huang et al. | 370/349 |
| 2009/0103501 A1* | 4/2009 | Farrag et al. | 370/337 |
| 2009/0225682 A1* | 9/2009 | Grote-Lopez et al. | 370/255 |
| 2009/0225703 A1* | 9/2009 | Pollack et al. | 370/328 |
| 2009/0303888 A1* | 12/2009 | Ariyur et al. | 370/252 |

* cited by examiner

CONTENTION PROTOCOLS FOR WIRELESS MEDIUM ACCESS IN COMMUNICATION NETWORKS

BACKGROUND OF THE INVENTION

1. Field of the Invention

The present invention relates to techniques for facilitating reliable medium access by multiple terminals in a wireless communication system or network.

2. Discussion of the Known Art

A common problem in wireless communication systems or networks, is controlling access to the medium in such a manner as to ensure reliable transfers of data among participating stations or nodes, Quality of Service (QoS), and fair access to the medium by all participants. A medium access controller (MAC) is normally employed to address these issues. Examples of wireless systems that employ MACs include various versions of WiFi (IEEE Standard 802.11), and various versions of WiMAX (IEEE Standard 802.16). All relevant portions of the mentioned IEEE standards are incorporated by reference.

Wireless access may be accomplished using either one of two methods, viz., reservation or contention. WiMAX is primarily a reservation based system wherein data is not transmitted unless one or more slots are reserved for the transmission. That is, in a reservation based system, the transmitting station (node) knows a priori that no other terminal will attempt to access the medium during certain reserved time slots. WiFi is primarily a contention based system where multiple terminals may attempt to access common medium resources (e.g., time, frequency, or code) simultaneously. Heuristics are normally employed to ensure that certain system objectives (fairness, QoS, etc.) for access are met. Unless reservations are preconfigured (not typical), some sort of contention access is required if for no other reason than to establish reservations for further transmissions. As such, virtually all wireless systems must incorporate some form of contention-based access control as part of their system.

Many forms of contention access are currently employed. For example, in ALOHA, wireless stations simply transmit as desired, each assuming that no other station is transmitting at the same time. If a second station is transmitting so that a first station's message is not properly received, a so-called collision has occurred. Thus, most ALOHA based systems also employ mechanisms to acknowledge receipt of a message, and retransmit messages that fail to reach their destination. The theoretical maximum efficiency for ALOHA is 18%. See, F. A. Tobagi, "Multiaccess Protocols in Packet Communication Systems", IEEE Transactions on Communications, Vol. COM-28, No. 4, pages 468-88 (April 1980) (hereafter "Tobagi"), at page 471. All relevant portions of the cited Tobagi article are incorporated by reference. By introducing additional complexity and delay, higher efficiencies can be achieved. For example, slotted ALOHA (S-ALOHA) can increase the theoretical maximum efficiency of pure ALOHA to 36% by dividing the resources on the medium into time slices, thus ensuring that a transmission made within a given time slice will potentially interfere only with other transmissions that are made during the same time slice. Id.

Carrier sense multiple access (CSMA) is another form of contention access. CSMA enhances ALOHA by requiring the transmitting station initially to check if the desired medium resources are occupied. If not, the station transmits using the desired resources. CSMA has a maximum theoretical efficiency in excess of 90% depending on many medium properties. Tobagi, at page 473. The performance of CSMA degrades with increasing distance between the stations, however. That is, for a constant data packet size, as range delay (the propagation time between all stations attempting to access the medium) increases, performance of CSMA degrades. For a broadcast system with a repeater where all transmissions are synchronized to a single point in space and time (such as a satellite system), the point at which maximum theoretical performance of CSMA degrades to the maximum theoretical performance of S-ALOHA is roughly when the range delay is one third of the time the packet occupies the medium. Tobagi, at 473-74. Another key degradation occurs when there are "hidden" nodes. These are nodes that cannot hear other nodes that are actively transmitting in the network, so that the probability of a collision is increased. This also decreases the effectiveness of CSMA, and is a common problem, for example, in mobile ad hoc networks (MANET).

While CSMA has a higher efficiency than other contention mechanisms in many situations, it can sometimes be less effective than S-ALOHA because of the mentioned range and hidden node issues. In such environments, it may be advantageous to switch over to S-ALOHA. As far as is known, however, no method or apparatus capable of combining certain features of CSMA and S-ALOHA access so as to optimize the performance of a given network, has been disclosed or otherwise made available. A need therefore exists to provide such a capability.

SUMMARY OF THE INVENTION

According to the invention, a method of controlling wireless medium access in a communication network having a number of terminals, includes defining one or more protocol message units for transmission by a given terminal which units correspond to an operational state of at least one of the terminal and the medium, defining a minimum packet size that is at least the size of a smallest one of the protocol message units, and allocating a number of time slots for transmission of packets from the terminals. The method also includes allocating within each time slot certain time periods corresponding to a number of contention opportunities and applying, at a given terminal and during the contention opportunities of each time slot, certain priority and backoff mechanisms so that packets are transmitted by the terminal during the time slots while (1) minimizing the occurrence of empty time slots at times when packets are available at the terminal for transmission, and (2) minimizing the number of time slots during which two or more packets are detected simultaneously on the medium at the given terminal.

According to another aspect of the invention, a method of controlling wireless medium access in a S-CSMA protocol network having a number of terminals, includes conducting a backoff procedure at a given terminal by defining a contention window (CW), counting a number of backoff slots between packets transmitted on the medium and detected at the terminal, estimating a window occupancy (WO) value as a function of the CW and the counted backoff slots, and detecting each transmission error (ER) that occurs on the medium. The method also includes modifying the CW according to current values of WO and ER, and randomly selecting from the modified CW a backoff value corresponding to a number of contention opportunities over which the terminal backs off prior to transmitting available data.

The present invention, referred to herein as slotted Aloha CSMA or SA-CSMA, overcomes the deficiencies of the prior art in that, inter alia, it allows features of both S-Aloha and CSMA to be used to advantage within one system. Basically, a slotted framework is created, and message data may occupy one or more consecutive time slots. Within each slot, however, contention opportunities are provided to allow stations to detect the presence of other stations, and to defer when another station occupies an earlier contention opportunity. The inventive backoff method, referred to herein as linear backoff (LB), is developed for use with SA-CSMA but can be used with most existing versions of CSMA as an alternative to other known backoff methods including binary exponential backoff (BEB).

For a better understanding of the invention, reference is made to the following description taken in conjunction with the accompanying drawing and the appended claims.

DETAILED DESCRIPTION OF THE INVENTION

Figure 1:
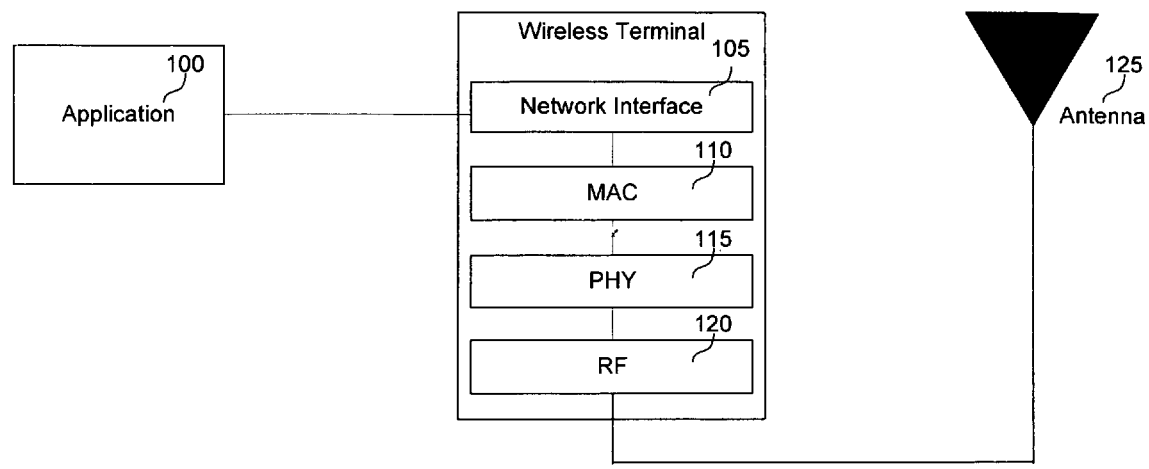
FIG. 1 is a block diagram a wireless terminal or station capable of operating using the protocols of the invention.

FIG. 1 illustrates an example embodiment of a wireless terminal. An application 100 (e.g., an Internet browser) runs outside the terminal, but may be integrated directly into the terminal. The terminal may be represented by function as having a network adaptor 105 or other interface that provides connectivity to devices outside the terminal. Wireless medium access is controlled by a medium access controller (MAC) 110. Modulation and coding as well as demodulation, decoding, and other signal processing functions, are accomplished by a physical layer (PHY) 115. The PHY 115 passes signals to/from an RF section 120 that filters, up-converts, and down-converts signals at corresponding radio frequencies (RF). RF signals are radiated and received by the terminal via an antenna 125 that is connected to or integrated within the terminal.

Signal processing inside the PHY 115 and the MAC 110 may be accomplished by various components known to those skilled in the art. For example, a microprocessor may be used to execute C language code to realize the MAC operation, and a dedicated application specific integrated circuit (ASIC) could be used to realize the PHY and some of the RF processing. Alternatively, the MAC 110 may be realized as random logic and integrated into an ASIC or a field programmable gate array (FPGA) with the PHY 115. Other possibilities exist. It will be understood by persons skilled in the art that the methods described herein may be carried out by any of the mentioned components, and by other components suitable for realizing a MAC functionality.

For example, one preferred configuration for realizing the inventive protocols would include a software defined radio (SDR) utilizing a microprocessor embedded within a FPGA along with supporting components, e.g., a Power PC processor embedded in a Xilinx FPGA. These devices are well known to those skilled in the art, as would be the implementation of the inventive protocols using such devices.

Figure 2:
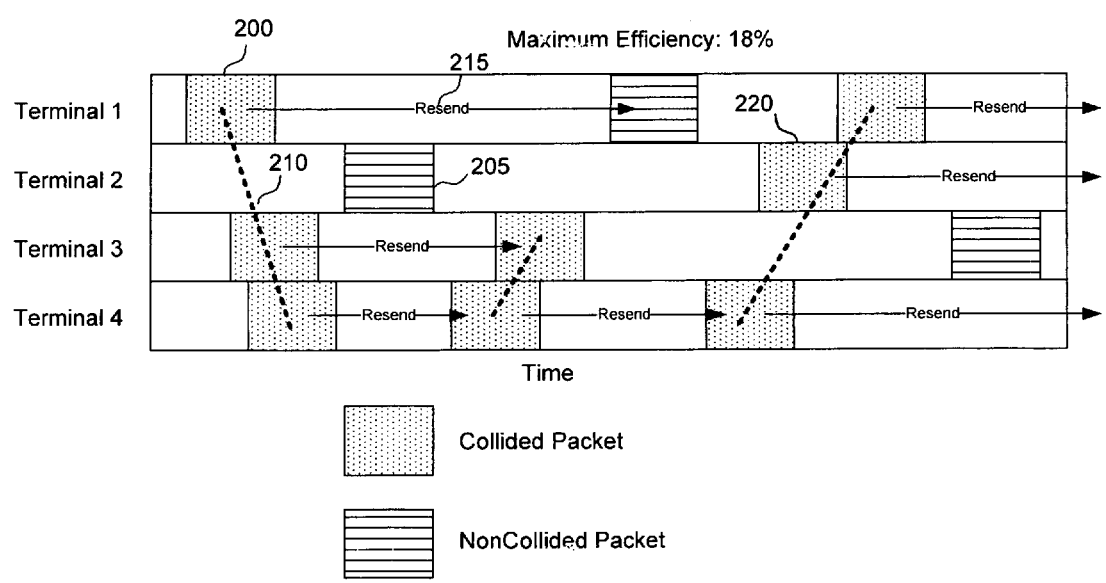
FIG. 2 is a timing diagram illustrating an example of ALOHA wireless medium access.

FIG. 2 illustrates an example of ALOHA access. ALOHA is a classic multiple access scheme wherein users transmit at will. As shown in the key legends for the figure, dotted packets represent packets portions of which have collided with portions of other packets, while non-collided packets are striped. Sets of packets that have partially collided with one another are joined by a dashed line, e.g., line 210. It is assumed in FIG. 2 that all collided packets are received incorrectly. For some coding and signal processing approaches, however, there is a chance that a packet is properly received even if collided. For reliable transmission of data, collided packets may be retransmitted, as is packet 200 following resend interval 215. A key assumption (not reflected in FIG. 2) is that the sending terminal has some means for determining if a packet collided. For example, in the case of a satellite system, the sending terminal may monitor the downlink (also being received by the receiving terminal). If a collision is detected, then the transmitting terminal knows it must resend. Or, acknowledgment messages may be used to indicate which packets are or are not received.

ALOHA is very inefficient. If many terminals are trying to access the medium much of the time, many collisions will occur. But if traffic is reduced in order to reduce the probability of a collision, then time on the medium will be wasted during which no packets will occupy the medium. There is a trade off between these states, and it can be shown that for ideal ALOHA the best efficiency achievable is only 18%. By efficiency is meant the percent of time the medium carries non-collided packets, versus collided packets or being empty.

Figure 3:
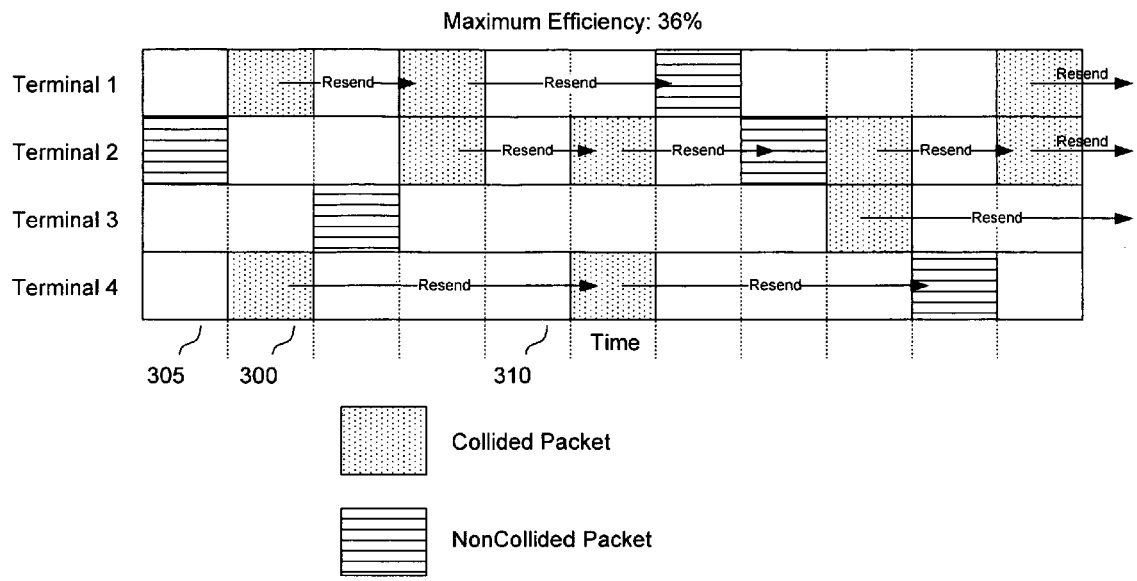
FIG. 3 is a timing diagram illustrating an example of slotted ALOHA wireless medium access.

FIG. 3 illustrates an example of slotted ALOHA access. This figure is similar to FIG. 2 except that time on the medium is slotted. That is, packet size and transmission times are limited so that a given packet always fits within a specified time period (slot). If two packets occupy the same slot as during slot 300, then a collision occurs as before. If only one packet occupies a slot as during slot 305, it is a non-collided packet. Some slots such as slot 310 might be empty because no packets are transmitted then. Because of the slotted nature of the medium, the possibility of a single packet overlapping with two other packets that do not themselves overlap, as is the case for packet 220 in FIG. 2, is eliminated. Because of this and other factors, the theoretical maximum efficiency of slotted ALOHA (36%) is twice that of the original ALOHA.

Figure 4:
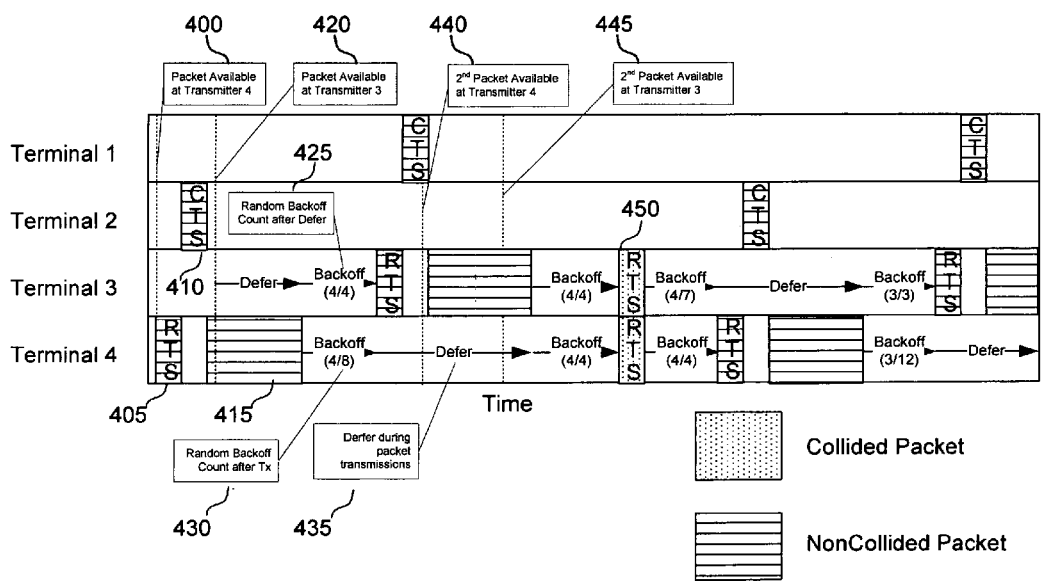
FIG. 4 is a timing diagram illustrating an example of CSMA/CA with RTS/CTS wireless medium access.

FIG. 4 illustrates an example of CSMA with collision avoidance (CSMA/CA) and RTS/CTS access. Other versions of CSMA exist, such as CSMA with collision detection (CSMA/CD). The request to send (RTS)/clear to send (CTS)

protocol is well known and often used as an option with CSMA/CA. Other variations on CSMA/CA and CSMA/CD can also be found in the literature (e.g. Tobagi, at page 473). It is contemplated that the inventive SA-CSMA protocol may incorporate any of the various CSMA techniques, and that the inventive linear backoff (LB) protocol may be incorporated into any of the existing CSMA techniques. The specific CSMA/CA approach presented here is based on an approach used in WiFi (IEEE 802.11).

In FIG. 4, vertical lines such as line 400 indicate that a packet has become available for transmission at one of Terminals 1 to 4. In the illustrated form of CSMA/CA, if a packet becomes available at a terminal for transmission while the medium is occupied, the terminal must defer until the medium is unoccupied and, in addition, must await a randomly selected backoff interval prior to transmission. The purpose of the backoff in not to resolve a collision, but to account for the fact that there is a much higher probability of a collision immediately after a transmission. That is, the probability of multiple packets becoming available at two different terminals during a transmission by a third terminal, is much higher than the probability of packets becoming available at two different terminals at the same instant while the medium is unoccupied.

Initially, when Terminal 4 acquires the packet for transmission, it senses the medium as being idle and, having already fulfilled any prior backoff requirement, Terminal 4 transmits a RTS 405 which attempts to reserve the channel for Terminal 4's packet. The RTS 405 indicates (either implicitly or through an embedded field) for how long the channel should be reserved. The intended receiver is Terminal 2 which responds with a CTS 410 (also identifying how long the channel needs to be reserved), ensuring Terminal 4 that the channel is clear and now reserved for its use. Terminal 4 then transmits its data packet 415 with high confidence that there will not be a collision on the medium. Note that if the medium is not busy, there should be no deferrals or backoffs between the RTS, the CTS, and the data packet 415.

During transmission of the data packet from Terminal 4, a packet 420 becomes available for transmission at Terminal 3. Terminal 3 senses the medium and determines the medium is busy, so it must defer and then perform a backoff 425. The notation used for each backoff in the drawing represents the amount of time backed off during a current time period followed by a "/", and then the backoff remaining at the start of the time period. For the backoff 425, Terminal 3 had no prior backoff in progress, drew a new random backoff time of 4, and backed off 4 full counts (4/4) without interruption by another transmission. Backoff time is counted only while the medium is unoccupied. The time values in this example are arbitrary relative units, since no time scale is given.

Each terminal must also perform a random backoff after making a transmission, even if the terminal has nothing further to send. This is the case for Terminal 4 after it completes its transmission of the packet 415, wherein the terminal draws a random backoff value of 8 and is able to complete 4 counts (4/8) before a transmission from Terminal 3 begins. In this case, Terminal 4's backoff is not for resolution of collisions, but to help ensure fairness on the medium. That is, the backoff helps prevent a "capture" of the medium by a successful terminal to the exclusion of other terminals. If all required backoffs have been completed by a terminal, and a packet becomes available for transmission at the terminal while the medium is idle, the packet may be transmitted without any backoff or deferral by the terminal. This was the case at the time 400 when the packet 415 first became available for transmission at Terminal 4.

Upon completing it's backoff (4/4), Terminal 3 starts its own RTS/CTS transmission sequence. Upon detecting the RTS, Terminal 4 has completed 4 of the 8 required backoff counts (4/8) and it interrupts its backoff count to defer at 435. Also, at a time 440 during the CTS from Terminal 1, a second packet becomes available for transmission at Terminal 4. Because the medium is in the process of being reserved, it is treated as though it were busy wherein Terminal 4 must continue to defer and then complete its backoff before attempting to transmit. Because Terminal 4 was in the process of performing a backoff, however, it does not need to draw a new random backoff value. Rather, Terminal 4 must simply complete the backoff in progress.

While Terminal 3 is transmitting its first data packet, a second packet becomes available for transmission at time 445 at Terminal 3. When Terminal 3 completes transmission of its first packet, it 3 picks a random backoff after which it will initiate transmission of the second packet. By chance, Terminal 3 picks a random value of 4 which is equal to the backoff count remaining for Terminal 4. Thus, both Terminals 3 and 4 attempt to transmit a RTS at the same time, wherein the respective RTS messages collide at time 450. Because of this collision, neither of the intended receiving terminals can hear either RTS, and no CTS results. Terminals 3 and 4 detect an error on the medium (no CTS message after the RTS), and both terminals back off by random values again. This time, Terminal 4 draws a smaller backoff value, and tries sending an RTS again after completing its backoff count (4/4). The RTS/CTS exchange between Terminals 4 and 2 succeeds, and the data packet gets transmitted. Finally, Terminal 3 completes its backoff (3/3), does a RTS/CTS exchange with Terminal 1, and transmits its packet.

The above examples are idealized in that they do not account for implementation issues such as medium delay, time required to detect a transmitted packet, the potential for hidden nodes, and how successful transmission of a packet is communicated. These issues may impact effectiveness of the protocol and should be considered for a real world medium. Other RF/receiver phenomenon can enhance performance. An example is the "capture" effect. Often when two signals are at very different power levels when received, the stronger signal can capture the receiver and be properly decoded even in the presence of the other signal. There are also known access techniques such as code division multiple access (CDMA). Forms of ALOHA, slotted ALOHA and CSMA (in all its variants) may be practiced in combination with CDMA and are known through the literature to those skilled in the art. These combinations may allow (or even encourage) multiple terminals to transmit at the same time. In addition, there are signal processing techniques such as multi-user detection (MUD) that permit multiple signals to share the medium even beyond what the capture effect and CDMA allow. By adding multiple antennas with enhanced signal processing such as adaptive arrays (AA) or multi-input multi-output (MIMO) effects such as capture, access techniques such as CDMA and MUD may be applied to even greater advantage in combination with ALOHA, slotted ALOHA, and CSMA.

CSMA based protocols are theoretically more efficient than ALOHA based protocols because they add to basic ALOHA the capability of sensing the medium and making decisions based on the medium state. But as the time needed to sense the medium and react to it increases (propagation time, packet sensing, acknowledgment time, etc), the advantages of CSMA are diminished until it becomes no more desirable than ALOHA, and potentially worse.

Figure 5:
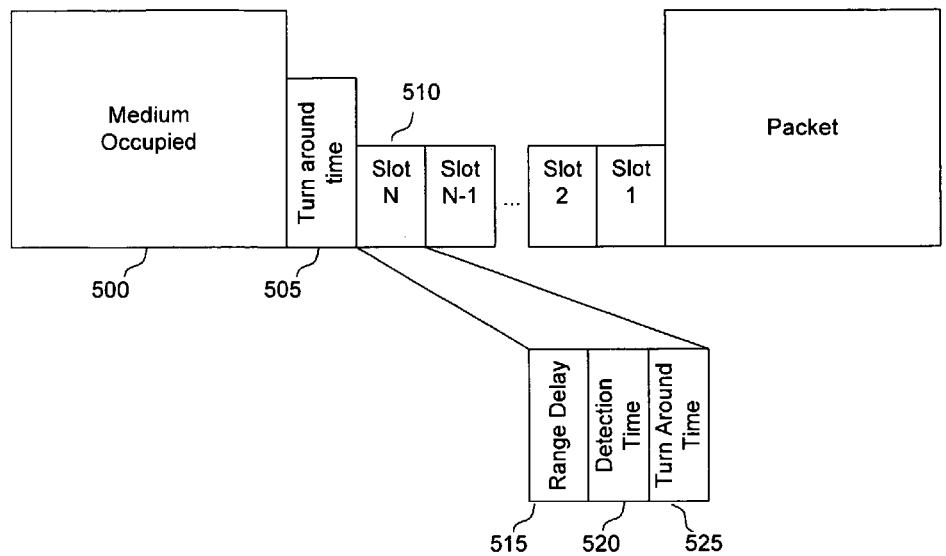
FIG. 5 is a timing diagram illustrating slotted CSMA medium access.

FIG. 5 is an example of medium access timing for a known slotted CSMA (S-CSMA) protocol. S-CSMA is a variation of CSMA wherein the times at which transmissions from terminals can start on the medium are slotted (quantized). There are several variations of S-CSMA, and the variation shown is based on a version of S-CSMA used in the WiFi standard (IEEE 802.11). Note how timing allowances are made to mitigate and control the impact of range delay, detection delay, and turn around time. FIG. 5 starts with the medium being occupied by a transmitted packet, at 500. When the packet ends, all terminals must then wait for a time period equal to a determined "turn around time" (TAT) 505 for the terminals in the network. The TAT 505 is the maximum amount of time needed to switch a terminal from a transmit mode to a receive mode, or vice-versa, and is assumed to be identical for all terminals in this example but need not be in real systems. Also, the time needed to switch from transmit to receive, versus the time to switch from receive to transmit, may also differ.

After the initial TAT 505, terminals start counting time slots 510. The slots 510 could be associated with a given terminal's backoff counts, such as indicated in FIG. 4. Sometimes, the slots 510 are used to establish priority between groups of terminals. For example, a given terminal could be required to wait until after one full slot has passed before decrementing its backoff counter, while another terminal may be allowed to decrement backoff counts in the first slot, or not even be required to backoff at all, i.e, always be allowed to transmit. Such techniques are used in practicing the IEEE 802.11 protocol. Note toward the bottom of FIG. 5 where it depicts how the size of a slot 510 is determined. Specifically, each slot 510 is large enough to include a maximum turn around time 525, a maximum range delay 515, and a maximum detection time 520. This ensures that all terminals will detect a transmission that starts during a given slot 510 before the same slot ends. In this way, S-CSMA avoids the possibility of collisions occurring because of variations in delay.

Theoretically, S-ALOHA, while not as good as CSMA, is twice as efficient as pure ALOHA and can maintain that efficiency advantage in certain scenarios despite impairments such as propagation delay. The ability of S-ALOHA to mitigate the impact of propagation delay depends very much on a network's topography. See Tobagi at page 474, showing graphs wherein the efficiency of slotted ALOHA remains fixed with increasing propagation delay. This result assumes a broadcast repeater network topology using the repeater as a common point in space for a timing reference. In S-ALOHA, packets are timed by terminals to arrive within a slot at a time referenced to the repeaters position in space, however. Because all packets must pass through this point in space even though range delay may vary significantly, the topology has no impact on the slotting structure for the protocol. The same statements may be made for S-ALOHA operating in a cellular network where a base station serves as the common point in space timing reference.

Figure 6:
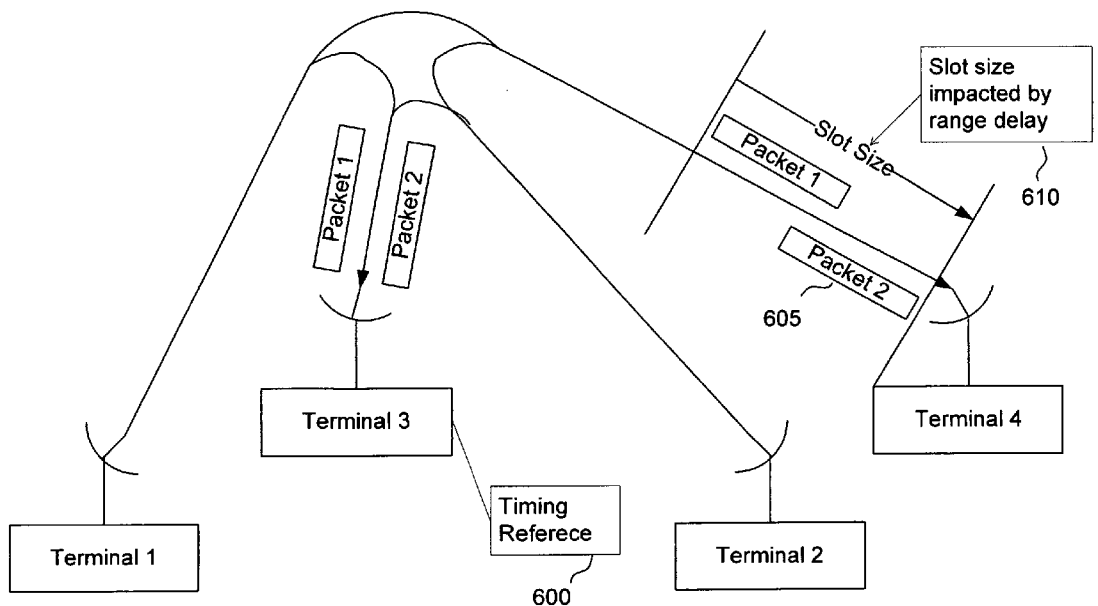
FIG. 6 illustrates a example of a MANET topology.

FIG. 6 illustrates a typical mobile ad-hoc network (MANET) topology. In cases where network terminals or stations are not mobile, this topology is sometimes simply called an ad-hoc or a "mesh" network. FIG. 6 illustrates an important constraint on the efficiency of S-ALOHA, namely, that if all packets do not pass through a common point in space, it is impossible to guarantee a common timing reference. So, in FIG. 6, Terminals 1 and 2 time their packets (packets 1 and 2 respectively) such that they arrive at the same time at Terminal 3, wherein Terminal 3 is used as a timing reference 600. Since both packets arrive at the same time and are of the same size (assuming S-ALOHA), the slots require no additional overhead for range delay. Unfortunately, one of the packets (say Packet 2, labeled 605) is destined for Terminal 4. Normally, the range delay between a given terminal and each of the other terminals will differ. Thus, if the network is synchronized for the delay to Terminal 3, there may be a large difference in the arrival times for Packet 1 and Packet 2 at Terminal 4. This can necessitate a much larger slot size 610 for S-ALOHA if both packets must always fit within the same slot. So, for large delays, S-ALOHA can become less efficient than even pure ALOHA.

Figure 7:
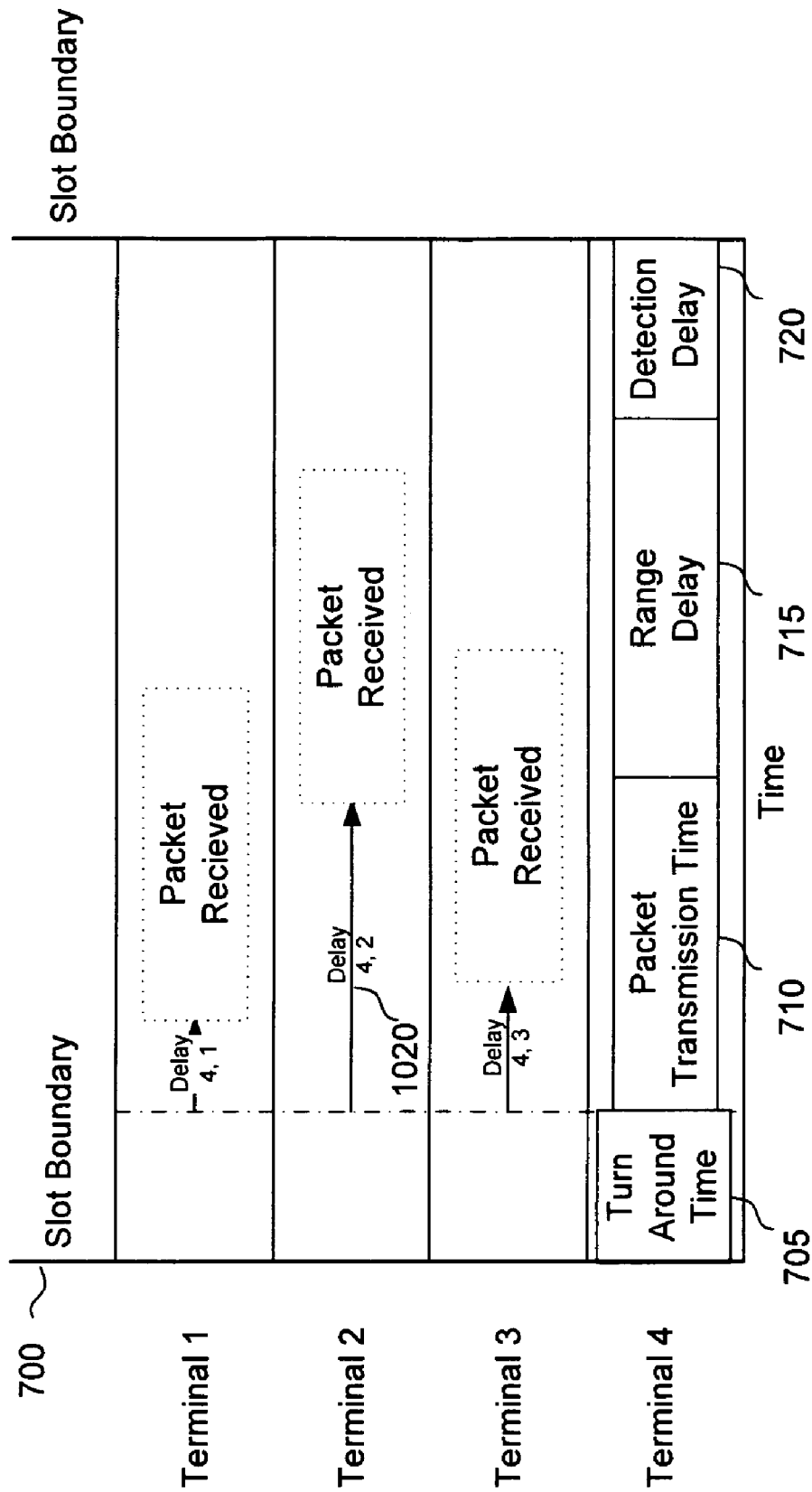
FIG. 7 is a timing diagram illustrating a slot construction in the slotted ALOHA protocol.

FIG. 7 illustrates a slotted ALOHA slot construction suitable for use in a wireless MANET network. The figure shows one S-ALOHA slot, with a packet transmission from Terminal 4 occupying the slot. The same basic system delays as were allocated for S-CSMA are allocated in FIG. 7. All timing is referenced to a slot boundary 700. A turn around time (TAT) 705 is allocated at the beginning of the slot. The TAT 705 corresponds to the maximum time required for terminals to switch between receive and transmit modes as needed to contend for the slot. After the TAT 705, terminals may transmit packets. In this case, Terminal 4 is shown transmitting a packet during a Packet Transmission Time 710. Varying propagation delays are represented in FIG. 7 for each of the other Terminals 1-3 where the transmitted packet is received. The figure shows that a range delay 715 and a detection delay 720 sufficient to cover the maximum range and detection delays expected for the system, are allocated within the slot. With such allocations, it is ensured that transmissions in one slot will not interfere with transmissions made within another slot.

An important issue in wireless MANET networks concerns which set of protocols, ALOHA, S-ALOHA or CSMA, will prove most efficient. As ranges increase, first CSMA, then S-ALOHA, and finally ALOHA become the most effective protocols. It is therefore desirable to provide a set of MAC functionality that can effectively easily "mode shift" between the these protocols based on the network environment.

Figure 8:
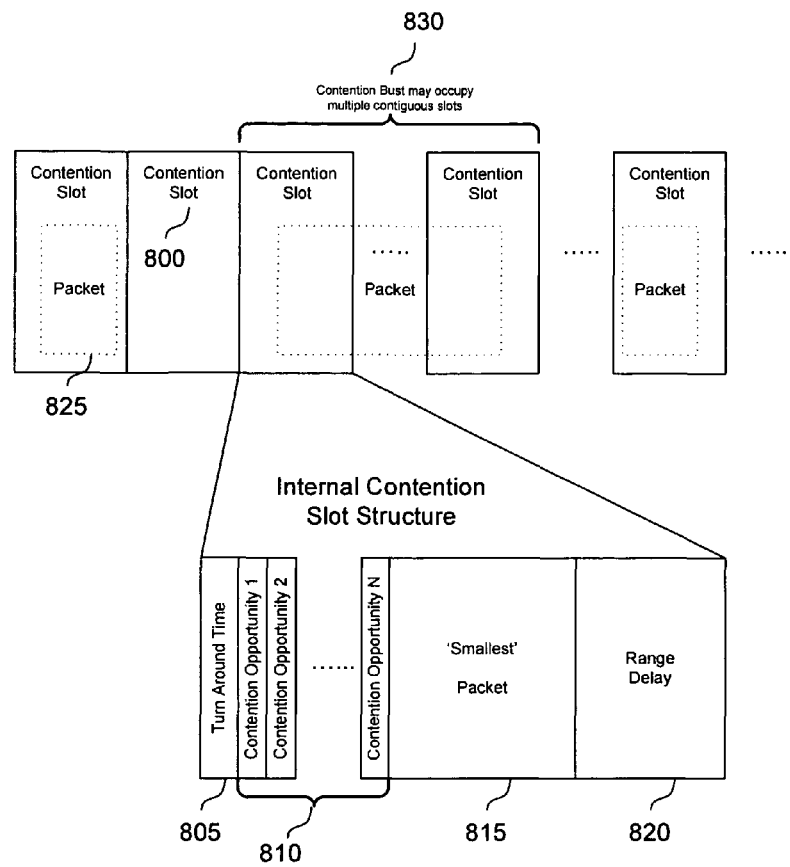
FIG. 8 is a timing diagram illustrating a slot construction in the inventive SA-CSMA protocol.

FIG. 8 illustrates a contention slot (CS) construction according to a protocol defined by the invention and referred to herein as slotted ALOHA-CSMA, or "SA-CSMA". The protocol obtains certain desirable features of CSMA, S-ALOHA and pure ALOHA notwithstanding network propagation delays and message size.

As shown toward the bottom of FIG. 8, each contention slot 800 includes an initial turn around time (TAT) 805 that may serve as a slot transition time and should be of sufficient duration to allow a network terminal or station to switch modes between transmit and receive, as required. Following the TAT 805, a series of contention opportunities (CO) 810 are defined. The number of COs in a given slot 800, as well as the size of each CO, may be defined as network parameters and set dynamically. Depending on the medium properties, each CO 810 should at a minimum include sufficient time to allow a given station to detect the start of a packet transmitted by any other network station. For some network topologies, each CO 810 may itself also include allocations for range delay and a certain TAT.

Further, each contention slot 800 includes an allocation approximating a smallest packet size 815 corresponding to the greatest amount of time required to send a complete protocol message unit (e.g., a RTS, a CTS, or an ACK message), plus a reasonably small amount of data (to be explained later) typically computed at the lowest PHY rate. Finally, an allocation for range delay 820 is also defined as a network parameter that can be set dynamically.

It is assumed that some form of network synchronization exists, for example, the Global Positioning System (GPS), beaconing, or distributed techniques such as described in the 802.11 standard. All transmitters would, however, have knowledge of when each CS 800 begins and ends. For the moment, assume that only a single access protocol is used in the network, namely, the inventive SA-CSMA protocol described herein. Time is then divided into a series of CSs 800 as shown at the top of FIG. 8. Packets 825 are transmitted within the CSs 800 and may occupy only a single CS. A packet may also occupy multiple contiguous contention slots that define a contention burst (CB) 830 in FIG. 8.

Figure 9:
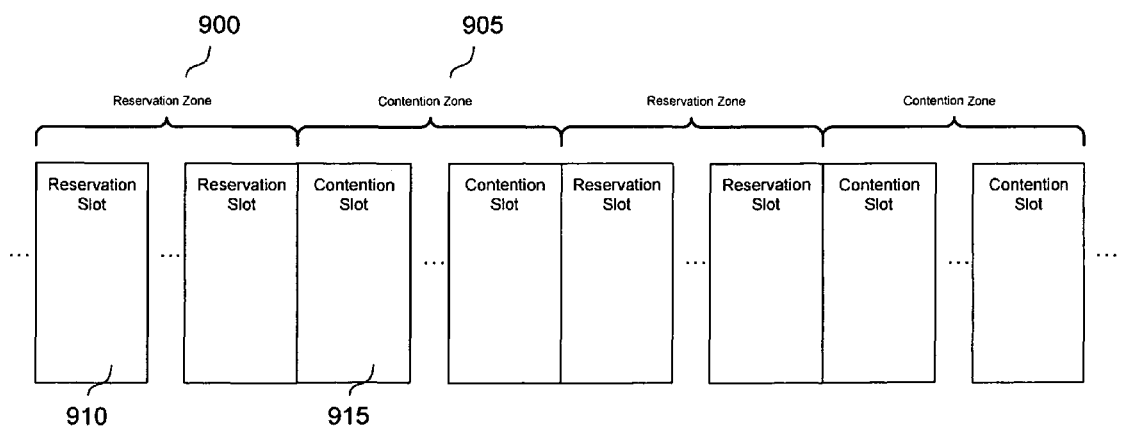
FIG. 9 is a timing diagram illustrating contention zones according to the invention.

FIG. 9 illustrates reservation zones (RZ) 900 and contention zones (CZ) 905 according to the invention. In particular, reservation techniques are coupled with contention techniques to establish reservations in a highly efficient manner. Each reservation zone 900 comprises a set of contiguous reservation slots RS 910, and each contention zone 905 comprises a set of contiguous contention slots CS 915. The RZ 900 and the CZ 905 may be allocated in a predetermined and alternating fashion, or they be set dynamically. Note also that modulation parameters used within the two zones may differ from one another. For example, OFMDA might be used in the RZ 900, and OFDM (with a smaller number of tones than OFMDA) may be used in the CZ 905. This might be desirable because the large number of tones used in OFDMA symbols may preclude an effective contention access mechanism. OFDM symbols using roughly the same bandwidth but with fewer tones would allow a more reasonable number of contention slots 915 than would OFDMA.

The inventive protocol operates by having all terminals in a wireless network practice contention techniques. Terminals use the COs 810 (FIG. 8) the same way the slots 510 are utilized in S-CSMA. When the last CO 810 is reached in a given CS 800, however, no further backoffs may occur until the first CO 810 in the next CS 800. All terminals not presently transmitting defer during those times within each CS 800 not allocated to the COs 810, and during the times of the RS 910 and the RZ 900. Other than this, all deferral and backoff techniques commonly used with CSMA/CA may also be used in SA-CSMA. Specifically;

1. Terminals may use the COs 810 as the slots 510 in FIG. 5 to perform a backoff;
2. Terminals may perform a backoff to resolve contention;
3. Terminals may perform a backoff to avoid collisions;
4. Terminals may perform a backoff to enforce fairness;
5. Terminals may perform a backoff to implement a certain quality of service (QoS) scheme;
6. Terminals may use the COs 810 to implement certain priority schemes; and
7. Terminals may combine the above techniques with RTS/CTS and other known reservation techniques.

FIGS. 10 to 14 illustrate an example application of the inventive SA-CSMA protocol. In each figure, a series of contention slots 1000 are shown with respect to four network Terminals 1 to 4. The series of contention slots starts in FIG. 10 with slots CS1 to CS3, continues in FIG. 11 (slots CS 4 to CS6), and so on to finish in FIG. 14 (slots CS 13 to CS15). It is assumed that a long period without transmissions precedes the first series of slots 1000 in FIG. 10, so that all the Terminals 1 to 4 have been reset to a known state.

While a number of different backoff schemes may be combined with the SA-CSMA protocol of the invention, one that differs from those used in other CSMA based protocols (such as 802.11) is preferred. The 802.11 standard practices so-called binary exponential backoff (BEB), wherein a defined contention window (CW) determines a maximum number of slots to be counted at a terminal for a given backoff interval. A uniform random distribution function then selects the actual number of slots for the interval between the values of 0 and (CW−1). Based on the state of a given terminal, the value of CW changes between CWmin and CWmax. Normally, the window is set to CWmin and, unless an error occurs on the medium (such as a packet failing to be acknowledged), the value stays constant. If an error occurs, the terminal changes its state and the CW value doubles. As used herein, "state" implies that the terminal tracks certain events, and those events determine its state. Based on its state (e.g., the last transmission resulted in an error), the terminal changes its behavior. If a second consecutive error occurs, the terminal would again change state by doubling the CW value again, and so on, until CWmax is reached. Once a packet is transmitted correctly, the CW value resets back to CWmin. As mentioned, this method of determining the CW value is referred to as binary exponential backoff or BEB.

While BEB may be used with the inventive SA-CSMA protocol, BEB does require feedback concerning the success or failure of a transmitted data packet. Success is normally determined by the transmission of an acknowledgment (ACK) message immediately from a destination terminal upon successful detection of a data packet from the originating terminal. If the originating terminal detects an acknowledgment, the transmission is deemed successful. If an ACK packet is not received, the transmission is assumed not to have been successful. This protocol is termed "immediate acknowledgment" (immediate ACK) since it requires an acknowledgment to be transmitted immediately after the data transmission for which an ACK was requested.

It is inappropriate to use immediate ACK for certain kinds of transmissions, however. For example, if multicast or broadcast type data is transmitted, it is generally impossible for all nodes that receive the data successfully to respond with an immediate ACK, since all the ACKs would collide with one another or cause congestion. This means there is no way to adapt to congestion on the medium if the congestion is due to a large amount of broadcast/multicast network traffic. And it is anticipated that for some applications of SA-CSMA, the predominant traffic will comprise broadcast and/or multicast information.

Moreover, it has been discovered that BEB may actually be suboptimal in certain operating environments. Recent studies suggest that the optimum size of the contention window (CW) depends on the average packet (or slot) size, and the number of transmitters actively contending for the medium. More importantly, it has been found that the optimum value of the CW is a substantially linear function of the number of contending transmitters. Accordingly, a preferred method of determining a backoff technique in SA-CSMA is described below, and is referred to as "linear backoff" (LB). The technique makes the CW value a substantially linear function of the number of contenders rather than an exponential function of the number of errors on the medium, and has the advantage that it does not require immediate acknowledgments in order to be effective.

The LB process starts by estimating the slope of a line relating optimum CW size and number of contenders based on a simulation, as a function of packet size, contention slot size, and number of contention opportunities per a contention slot. For this disclosure, the slope is termed "K" and is assumed equal to 2 for the SA-CSMA examples. For S-CSMA examples described below in connection with FIGS. 15 to 17, K is set to 15. The exact value of K is not critical to the operation of the invention. While any reasonable value of K should work, preferred values may be determined by simulation. The value of 15 for K in the S-CSMA examples of FIGS. 15 to 17 was determined based on simulations of an IEEE 802.11 operating environment (modified to practice the invention) in a known MAC Layer Designer (MLD) simulator. The value of 15 for K was found to be satisfactory for a variety of packet sizes in a particular topology of interest in an 802.11b system.

The value of 2 for K, when applied to the inventive SA-CSMA protocol, was selected by intuition. Other values for K such as, e.g., 1.5, 3, 20, 100 or higher may also work with varying degrees of success. Optimal values can easily be determined via simulation in the same way as done for an 802.11b (S-CSMA) environment by one skilled in the art. Standard tools for such simulations are MLD, OPNET, QualNet, and NS2. Custom C language could also be used. Methods may also be used to determine K dynamically based on the type of traffic currently occupying the medium.

Once K is determined, a method of estimating the number of contenders is required. One method is to divide a current contention window (CW) value by the number of backoff slots (contention opportunities in SA-CSMA) between a current transmission and the most recent prior transmission on the medium, and to use the result as an estimate of the instantaneous number of contenders on the medium. This value is termed the window occupancy (WO) 1005 in FIGS. 10 to 14. Since this is a very noisy estimate, some form of filtering may be required. While various filter functions may be possible, a currently preferred solution is a so-called moving average filter (MAF) the implementation of which is generally known to those skilled in the art. The size of the MAF in the example of FIGS. 10 to 14 is set at 4, but, depending on specifics, smaller (e.g., 1) or larger (e.g., 1024) values might be used. The MAF size may also be adaptive.

Figure 10:
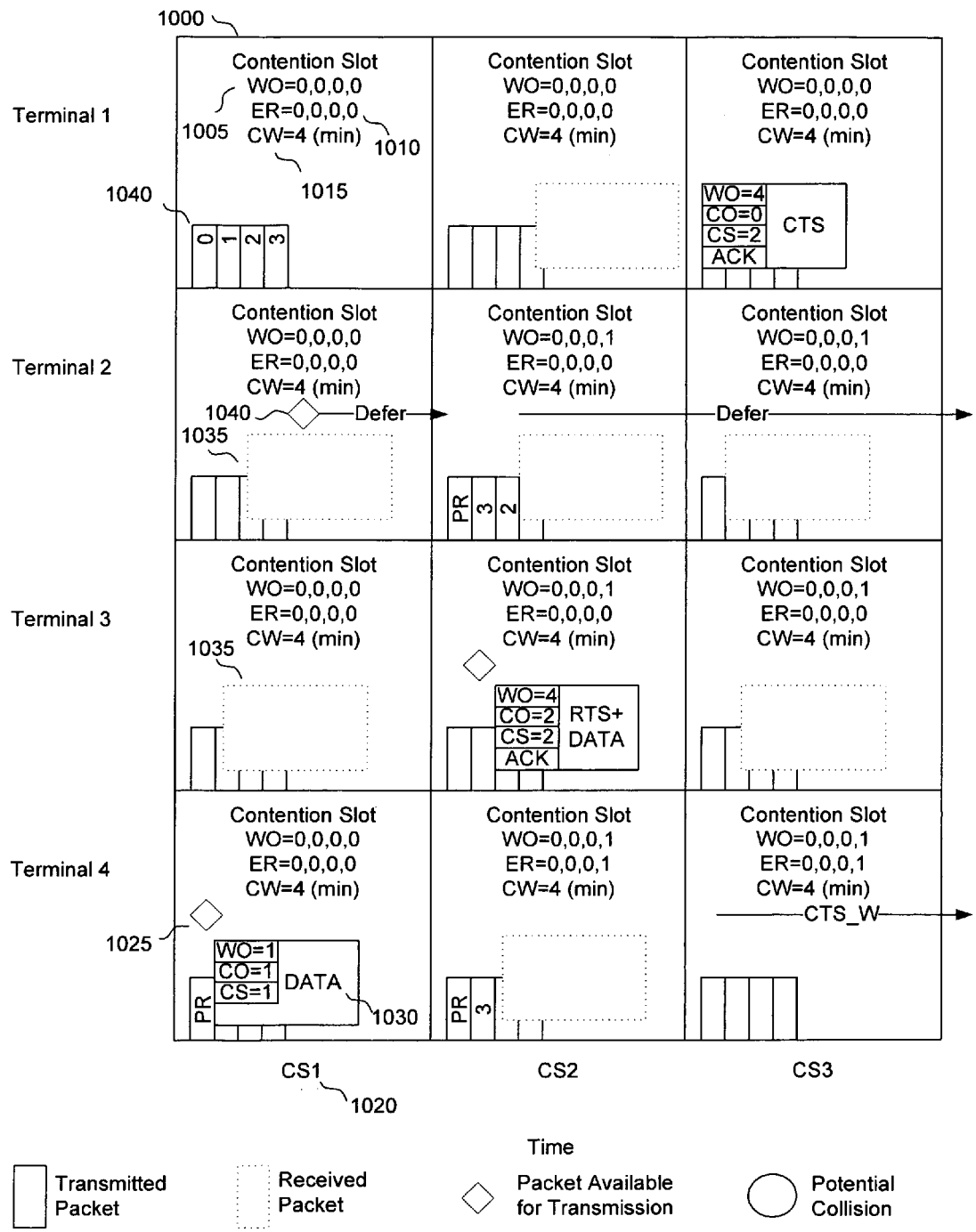
FIG. 10 illustrates three successive contention time slots in an example of the inventive SA-CSMA protocol.

In FIGS. 10 to 14, the four values shown next to WO are the four most recent estimates of WO used in the MAF in determining the current CW. The oldest value in the filter is on the left, and the newest is on the right. The figures show the four current values of WO used in the MAF for each terminal at every contention slot. In FIG. 10, all terminals start with the WO 1005 set to 0, 0, 0, 0; which is to say that no terminal is presently contending for the medium.

Because a collision represents multiple contenders attempting to access the medium at the same time, collisions require special treatment. Each time an error on the medium is detected, it is treated as though two attempted transmissions collided with one another. Although an error could be caused by more than two terminals attempting to access the medium simultaneously, the SA-CSMA protocol assumes that exactly two contenders had attempted access, and any additional contenders are not considered. A value for WO is computed, and an error flag (ER) 1010 is set.

Each time the error flag is set, it represents one additional contender trying to access the medium beyond those represented by the WO values, and another filter is used to determine the total number of errors that occurs (additional contenders) over a period of time. Again, many different filter functions can be used in the invention. A currently preferred filter is a summation filter (SUM) that sums all the values in the filter window. Each time activity is detected on the medium (either a transmission or an error), the values of the SUM and the MAF filters are updated. If the detected activity is a correct transmission, a zero is entered for ER in the SUM filter. If an error is detected, a 1 is entered for ER in the SUM filter. The appropriate window length for the sum filter depends on specifics of the medium, and is set to 4 in the SA-CSMA example of FIGS. 10 to 14. Other values for the window length (e.g., 1-1024) may also be used. The currently preferred sizes of the SUM and the MAF filters are 4 each.

The window size for ER need not be the same as that for WO and may be adaptive. Again, the values shown in FIGS. 10 to 14 for ER 1010 are the contents of the SUM filter, with the oldest on the left and newest on the right. The values for each terminal are shown in each contention slot. In FIG. 10, all terminals start with ER 1010 set to 0, 0, 0, 0; which is to say that no one is presently contending for the medium.

The value of the CW 1015 may then be computed as follows:

$$CW = CEIL(K*(MAF(WO) + SUM(ER)))$$

As mentioned, K is set to 2 for the SA-CSMA example of FIGS. 10 to 14. The MAF divides the sum of the WO values by 4 (the number of values in the filter), and the SUM filter simply sums the four values of ER. The operator CEIL finds the smallest integer that is larger than the value it operates on. If after this computation the value of CW is less than CWmin, it is set equal to CWmin. If the computed value of CW is larger than CWmax, it is set equal to CWmax. For the example in FIGS. 10-14, the value of CWmin is 4, and CWmax is 256. But values as small as 0, or as large as, e.g., 128, could be considered for CWmin. Values as small as 0 or as large as, e.g., 2048, could be considered for CWmax as long as CWmax is greater than or equal to CWmin. As shown in FIG. 10, the initial value of CW 1015 for all the nodes is set to CWmin since no transmissions have been detected on the medium for a while.

In FIG. 10, the sequence of events starts at contention slot 1 (CS1), labeled 1020, with a DATA packet 1030 becoming available at Terminal 4 as indicated by a diamond 1025. Since there has been no activity on the medium for a certain time, Terminal 4 immediately transmits the DATA packet 1030. In this example, all terminals are assumed to hear one another except for Terminals 1 and 4, so a copy of the packet 1030 appears in dashed lines labeled 1035 only at Terminals 2 and 3 who can hear the transmission. The packet 1030 is not received at Terminal 1 during CS1 (see top row of FIG. 10), so Terminal 1 does not react to the packet in any way.

Some control fields are preferably embedded in the DATA packet 1030. For example, a WO field corresponds to the current value of WO at the sending Terminal 4. Since there was no recent activity on the medium, the number of elapsed COs since the last transmission by a network terminal is assumed to be large. So, regardless of how large the current CW is, a small fraction (less than 1) results. It is assumed for the WO field that the CEIL function was applied to WO prior to transmission, and that only integer values of WO are transmitted. Hence, WO is set to 1 in the control field of the packet 10320. Since protocol overhead matters, it is assumed for this SA-CSMA example that four bits are allocated to the WO field. This means that from 0 to 15 contenders can be represented. If WO were larger than 15, the value 15 would be used. Larger or smaller fields (e.g., 1 bit to 8 bits in size) could also be used for this purpose, but 4 bits is a preferred value for SA-CSMA.

For any correctly received data packet, the value of WO embedded in the control field of the packet is used as the next entry in the MAF of the receiving terminal. While each terminal could estimate its own value of WO for each received packet, random biases could occur that would cause the CW at some terminals to be set much higher than in others. Sharing estimates of WO helps to preclude that possibility. Also, the number of COs between each transmission as measured at each terminal can vary. By placing WO as a control field in each transmitted packet and using that value at all terminals that hear the packet, variances in estimates at each terminal concerning the number of contenders may be avoided.

The specific contention opportunity CO in which a packet transmission begins, is also identified in a control field of the packet. Each CO within a given contention slot (CS) is preferably sequentially numbered, beginning with 0 as shown at 1040 for Terminal 1 in FIG. 10. For example, in the case of Terminal 4, transmission of the DATA packet 1030 began in CO=1 of CS1. While omitted for clarity, the same number assignment is used for the COs in every contention slot at each terminal. In the present example, there are four possible COs (numbered 0 to 3) per contention slot, so two bits are assigned for the CO field of a packet. More or fewer bits may be allocated for the CO field (e.g., as small as 1 bit or as many as 8 bits) but 4 is a preferred value for SA-CSMA. This allows for a better estimate of delays, as explained later.

The number of contention slots occupied by a transmission (or, alternatively, a duration value as in the IEEE 802.11 standard) is also indicated in a separate CS control field. It is assumed for the present SA-CSMA example that four bits are allocated for the CS field, thus allowing up to 15 consecutive slots to be reserved. While four bits is a preferred value for SA-CSMA, as little as, e.g., 1 bit, or as much as, e.g., 8 bits, may be allocated to the CS field. In the present example, the DATA packet 1030 occupies only one slot, so CS=1 in the control field of the packet. Finally, if an acknowledgment (ACK) of the packet is required, such may be indicated by a corresponding ACK field in the packet that may be one bit in size. Since no ACK is required by Terminal 4, no ACK request is indicated in the packet 1030.

During the data transmission by Terminal 4, a packet 1040 becomes available at Terminal 2 during CS1. Because the packet 1040 became available while the medium was occupied, Terminal 2 must first defer and then perform a backoff prior to transmission of the packet 1040. And because packet 1040 became available in CS1, the packet 1040 has an associated CW value of 4. Assume Terminal 2 randomly selects a backoff value of 3 from the set of integers from 0, to (CW−1) or 3.

Shortly after transmission of the packet 1030 from Terminal 4 completes, a contention slot transition boundary occurs. At that time, all terminals update their CW parameters (WO and ER). Terminals 2 and 3 copy the WO field value from packet 1030 into their corresponding filters. Because Terminal 1 did not hear packet 1030, however, Terminal 1 does not react to the packet.

Note that wireless terminals are generally assumed to be "blind" while they transmit, so they are unable to detect a collision except by monitoring for acknowledgments or other confirmation after a transmission. If a packet does not require acknowledgment, the terminal has no real time feedback mechanism to judge if a collision has occurred on the medium. For the present example of the SA-CSMA protocol, all packets not requiring an immediate acknowledgment are assumed by their sending terminals to have collided. While there is no requirement to retransmit the packet, the ER flag for the sending terminal is nonetheless set as if a collision had been detected. Thus, in CS2, Terminal 4 sets its ER filter to 0, 0, 0, 1. While SA-CSMA may operate without setting ER=1 (but by setting ER=0 in this case), ER is set to 1 in the preferred implementation.

SA-CSMA preferably requires each network terminal to implement a post backoff after every transmission from the terminal. Thus, after the update for its most recent transmission (at the beginning of CS2), Terminal 4 selects a post transmission backoff of 3, and initiates a backoff.

In CS2, Terminal 2 begins backoff before attempting to transmit its packet 1040. In this example, the first CO (CO=0) in each contention slot is preferably reserved as a priority (PR) "slot" for control and priority transmissions, and is not counted with respect to the duration of Terminal 2's backoff. The first CO of each contention slot is labeled PR in the drawing for all terminals that are performing active backoffs. Note that in some implementations of SA-CSMA, the PR slot may be larger than the following contention opportunities (COs) within a given contention slot, thus allowing for propagation time within the PR slot. The present example assumes that the PR slot and the COs that follow it are all the same size.

During the second CO of CS2, a packet destined for Terminal 1 becomes available at Terminal 3. Because the medium is not occupied and it has no other backoff obligations, Terminal 3 can transmit immediately and chooses to use RTS/CTS since the packet requires a multi-slot transmission. And because only one backoff CO has passed since the last transmission on the medium (from Terminal 4), and its current CW value is 4, Terminal 3 computes WO as 4 and includes that value in the WO control field of its packet. Terminal 3 also notes it initiated transmission at CO=2, that the data packet is expected to extend over two CS (CS=2), and requires an acknowledgment. If there is still space in the slot, Terminal 3 may piggy back some of the data on its RTS so as to increase overall efficiency.

Terminal 1 hears the RTS from Terminal 3 and, in the next CS (CS3), responds with a CTS and echoes back some of the parameters from Terminal 3's RTS package; namely, WO=4, CS=2, and ACK, so that other local stations who can't hear Terminal 3's packet will be apprised of the occupation state of the medium. Terminal 1 sets CO=0 rather than 2, because Terminal 1's CTS is entitled to use the priority (PR) "slot" whose CO number is defined herein as 0.

Figure 11:
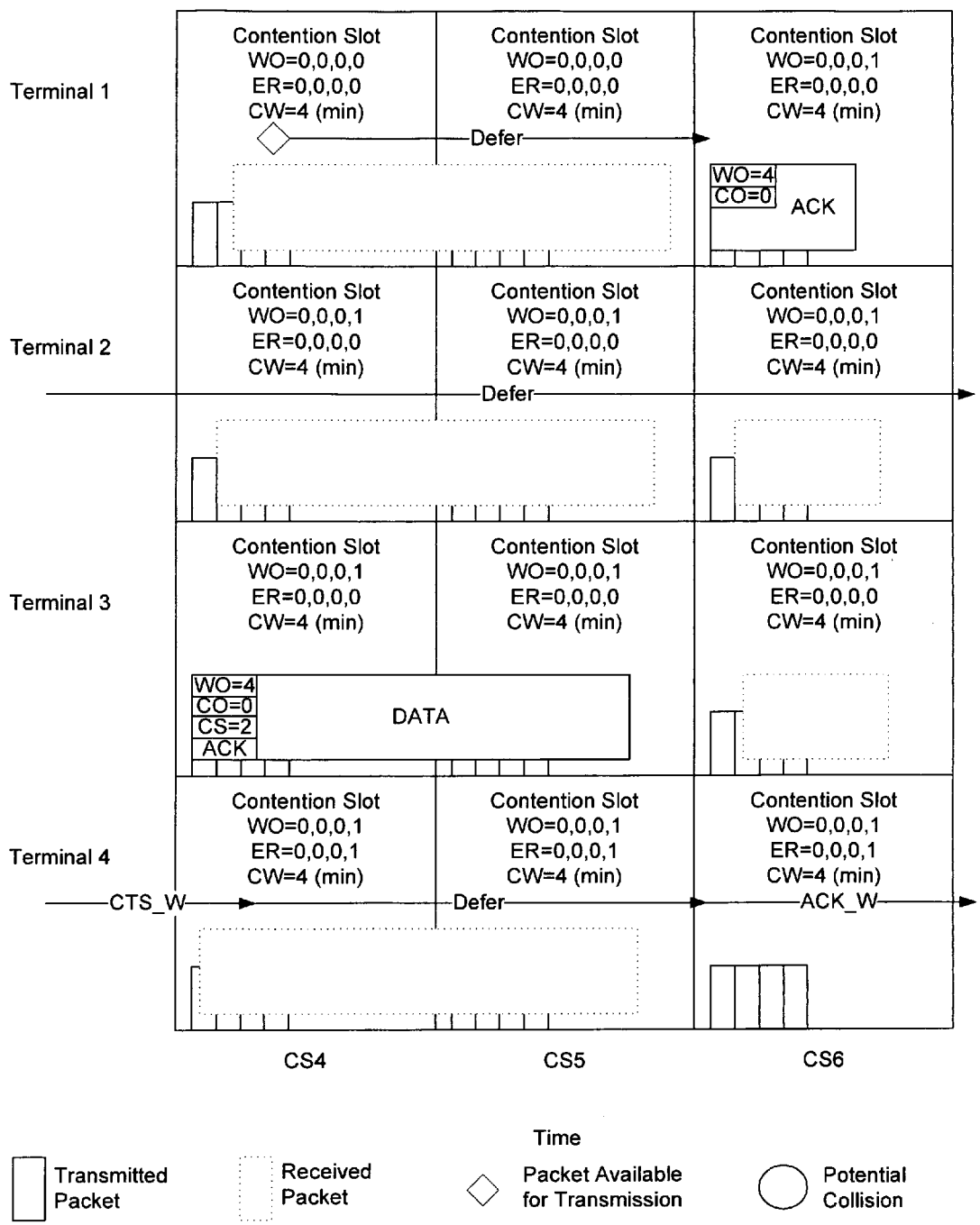
FIG. 11 illustrates three successive contention time slots following the slots in FIG. 10.

All terminals except Terminal 4 hear the CTS transmission from Terminal 1. But because Terminal 4 did hear the RTS transmission from Terminal 3, Transmitter 4 set a timeout window (CTS_W) of sufficient duration to allow the responsive CTS from Terminal 1 to access the medium. The window covers not only a responsive CTS, but also a portion of the following contention slot that covers the beginning of a data packet should Terminal 3 should transmit one. An important point is that unlike S-CSMA in the IEEE 802.11 standard, the inventive SA-CSMA may assume propagation delays larger than a contention opportunity. Because it knows in which CO Terminal 3 sent the RTS, Terminal 4 can calculate exactly how long its timeout window must be in order to cover the priority slot to be used for the packet by Terminal 3, including transmission delay. If no data message is received, Terminal 4 would immediately start counting COs again once the CTS window expires. As seen in FIG. 11, Terminal 4 may count backoff intervals starting at CO3 of CS4, since its CTS_W window ends in CO2 of CS4. Terminal 4 may not initiate a transmission during its CTS_W window, and is not allowed to post count COs in CS3. While some implementations of SA-CSMA might allow post counting of the COs that would otherwise be counted during a normal backoff in CS3, the preferred implementation does not.

During CS4 (see FIG. 11), Terminal 3 starts sending its DATA packet which extends in time also into CS5. Terminal 3 starts its transmission in the priority slot (CO=0), since the preceding RTS/CTS exchange between Terminals 3 and 1 (during CS2 and CS3) effectively reserved the entire length of CS4 for the transmission, and no other contention is allowed. During the packet transmission from Terminal 3, a packet becomes available for transmission at Terminal 1. Terminal 1 then uses its current CW value of 4, and randomly draws a backoff value of 1 to associate its packet transmission. Terminal 1 must also defer its transmission until completion of Terminal 3's DATA packet transmission which extends through CS5. Note that both Terminal 2 and Terminal 4 also defer transmissions and backoff counts over the duration of the transmission from Transmitter 3.

In FIG. 11, we also see an ACK transmitted from Terminal 1 during CS6. The ACK still carries the original WO value of 4 from the RTS sent by Terminal 3 during CS2, and uses CO=0 since the ACK is an expected control message. As was the case with the CTS sent by Terminal 1 during CS3, Terminal 4 does not hear the ACK from Terminal 1. But Terminal 4 knows from the data message sent by Terminal 3 during CS4 & CS5, when Terminal 1 should be sending the ACK (i.e., at the start of CS6). Terminal 4 therefore defines an ACK Window ACK_W that extends over CS6 and treats the medium as though it were occupied during that contention slot.

At the boundary between CS6 and CS7 (FIGS. 11 & 12), all terminals update their backoff parameters (WO, ER, and CW) for the completed transaction (also termed a message sequence). Note that updates to these parameters are normally made for each transaction or message sequence, with an RTS/CTS/DATA/ACK sequence being treated as a single transaction. All terminals shift their current values of WO and ER to the left by one, and update WO with the value (4) used in the most recent transaction. Since no errors are detected, the new (rightmost) value for ER is 0.

Figure 12:
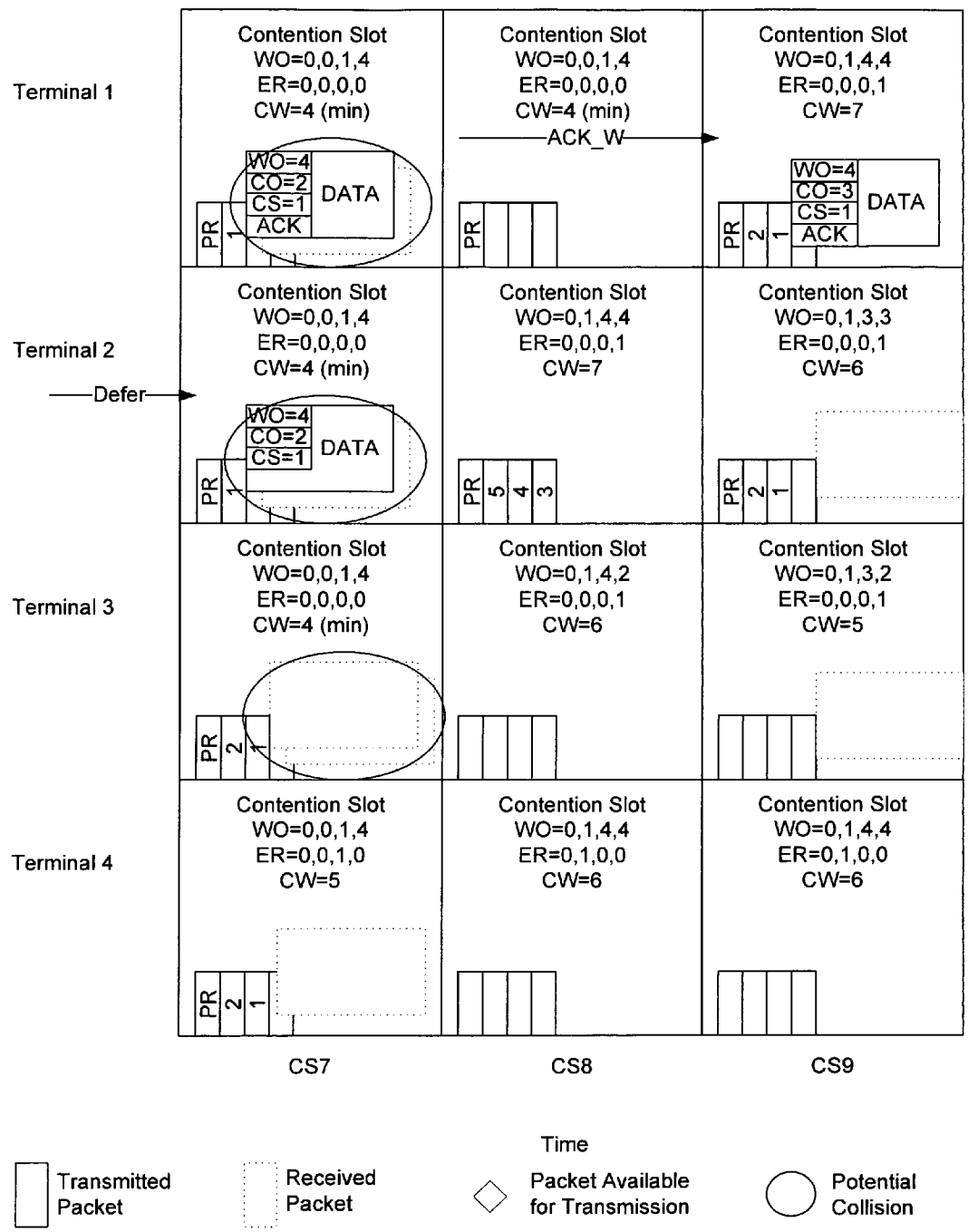
FIG. 12 illustrates three successive contention time slots following the slots in FIG. 11.

Moving to the left of FIG. 12, in CS7, all terminals must perform a backoff. That is, Terminal 4 needs to complete its post backoff from its earlier transmission during CS1, Terminals 1 and 2 have pending packets requiring backoffs before their transmission, and Terminal 3 must conduct its post transmission backoff. After updating its backoff parameters at the boundary between CS6 and CS7, Terminal 3 selects a random backoff value of 2, and all four terminals complete their backoffs during CS7. Note that because of transmission delays, Terminals 1 and 2 backoff by one CO and Terminals 3 and 4 backoff two COs, before Terminal 1 and Terminal 2 each initiate a DATA transmission during CS7.

Because both Terminals 1 and 2 transmit in CS7, a potential collision occurs. The collision is "potential" since we do not know to which terminals the transmissions were destined. If each intended receiver hears only the transmission intended for it, the transmission can be processed normally and no collision has effectively occurred. But assume Terminal 3 hears both transmissions simultaneously and is unable to resolve them. Several ways are known to detect failed transmissions or collisions. For example, if a received signal strength indicator (RSSI) rises above a certain level but no valid data packet has been detected, an error is assumed. It is also rare for packets to coincide completely. For example, it is possible to detect a synchronization preamble (as commonly used), and then have the associated packet become garbled by a second overlapping transmission, so that the start of a transmission is detected but no valid packet is received. This too would count as an error. Both of the mentioned methods of detecting a busy medium are used, for example, in the IEEE 802.11 standard. Similar techniques may be used with the inventive SA-CSMA protocol.

Here, Terminals 1 and 2 are unable to determine that their packets collided because the terminals were both transmitting and thus could not listen for collisions. At the boundary of CS7 and CS8, all terminals behave differently. Terminal 1 required an ACK for the DATA packet it transmitted during CS7, so it set an ACK window (ACK_W) over CS8 during which Terminal 1 is waiting for a response. Terminal 2 did not expect an ACK for its transmission, so it updates its WO filter in CS8 with the value of 4 which it transmitted in CS7, and with a 1 in its ER filter since Terminal 2 must assume an error when sending a packet for which no immediate ACK will be received. The calculation for CW then becomes:

$$CW = CEIL(K*(MAF(WO) + SUM(ER)))$$

$$CW = CEIL(2*((0+1+4+4)/4) + (0+0+0+1))$$

$$CW = CEIL(2*(2.25+1)) = CEIL(6.5) = 7$$

Terminal 2 then picks a random backoff value between 0 and 6, e.g., 5, and initiates backoff during CS8. Note that Terminal 2 is unaware of the ACK window implemented by Terminal 1, since Terminal 2 did not hear the packet transmitted from Terminal 1, i.e., Terminal 2 was itself transmitting and unable to monitor the medium at the time. The same is true for Terminals 3 and 4, i.e., Terminal 3 could only detect that a collision occurred, and Terminal 4 is out of direct range of Terminal 1.

Terminal 3 detected a collision error on the medium during CS7. Using its then current CW of 4, Terminal 3 computes the value of WO as (4/2) or 2, updates it WO filter with this value, and updates its ER filter with a 1 at the beginning of CS8. Note that Terminal 3 completed its post backoff count and, if it had a packet to transmit, would have initiated transmission in CO=3 of CS7 (increasing the multiplicity of the collision). Note also that if a packet becomes available at a terminal while the terminal is performing post transmission backoff, the packet becomes associated with the ongoing backoff, i.e., there is no need to modify the current backoff with a new value or to perform a second backoff, and the packet may be transmitted once the ongoing backoff is complete. On the other hand, if a post transmission backoff is completed when a new packet becomes available for transmission, and the medium is detected as being idle by the originating terminal, the packet may be transmitted immediately. If the medium is occupied, however, the originating terminal must first defer, and then a new backoff must be performed before the packet can be transmitted.

Returning to the example at CS7 in FIG. 12, we see that Terminal 4 actually received the DATA packet transmitted by Terminal 2 without error, so Terminal 4 updates its filter parameters accordingly (WO=4 and ER=0) at the beginning of CS8.

At the beginning of CS9 in FIG. 12, Terminal 1 realizes its requested ACK was not returned during the window ACK_W that it set in CS8, and that an error has in fact occurred on the medium. Terminal 1 updates it parameters accordingly (using WO=4, the value it last transmitted, and setting ER=1). Applying the above CEIL function, Terminal 1 computes a new CW=7, thus defining a random backoff range of values of between 0 and 6 before retransmission. By chance, Terminal 1 selects a value of 2 for performing a backoff during CS9, and then retransmits the failed transmission. The backoff parameters transmitted in the packet must be recomputed. Since its new CW is 7, and it counts two COs from the prior transmission (that included the missed ACK), Terminal 1 computes WO as CEIL (7/2)=CEIL(3.5)=4.

Note that Terminal 1 is at a relative disadvantage to Terminals 2, 3 and 4, since it could not count backoffs during its ACK_W window in CS8 while Terminals 2, 3 and 4 could do so. Some implementations of SA-CSMA may allow post counting of COs following the end of an ACK window so that Terminal 1's backoff requirement would be satisfied by CO1 and CO2 in CS8, but Terminal 1 still would not be allowed to transmit until CS9. Terminal 1 may then initiate transmission in CO1 of CS9 without conducting further backoffs. The currently preferred implementation is not to allow post-counting of backoff intervals during an ACK window. If permitted, such counting should be performed only by a terminal having a data packet awaiting an ACK, and not by other terminals that simply heard the data packet and set their own ACK windows. Note that during CS9, Terminal 2 also completes its backoff. Not knowing that its prior transmission collided and having no other packets for transmission, Terminal 2 takes no further action, however.

Figure 13:
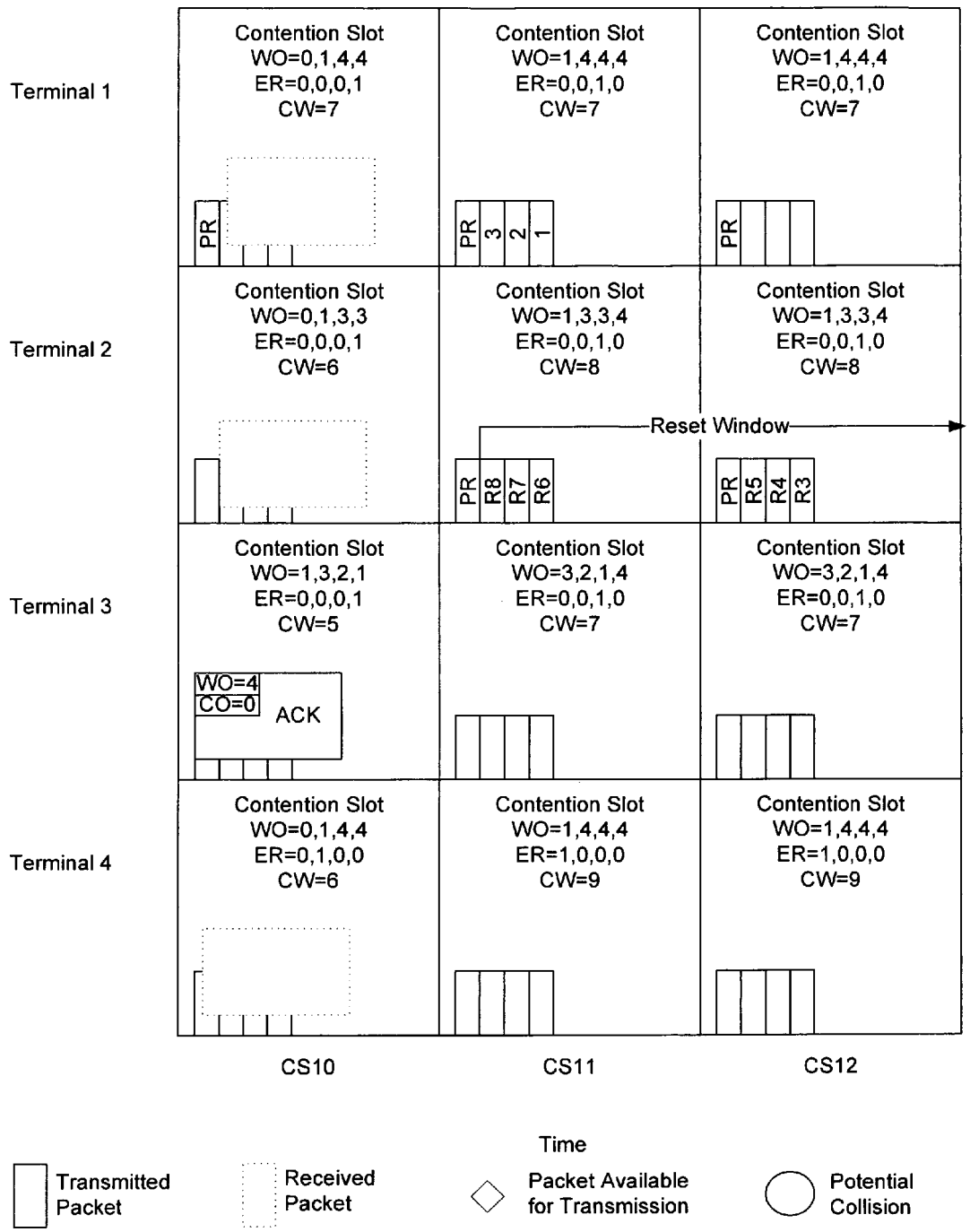
FIG. 13 illustrates three successive contention time slots following the slots in FIG. 12.

In FIG. 13, at the beginning of CS10, no update of backoff parameters occurs. All terminals that heard Terminal 1's packet in CS9 know that an ACK is required to complete the transaction on the medium, and will not update their parameters until the transaction completes. We now see that Terminal 3 was the intended receiver for the packet from Terminal 1, since Terminal 3 responds with an ACK in CS10.

Although there are no further transmissions, the sequence of contention slots (CS) continues in FIG. 13 with CS11. Here, all terminals update their filter parameters with respect to the transaction completed on the medium during CS10. We also see that Terminal 1 draws a post transmission backoff of 3, and continues its backoff over CS11 and CS12. Note that if a packet had become available at Terminal 1 during CS11, it would have been transmitted starting in CO=1 of CS12.

Figure 14:
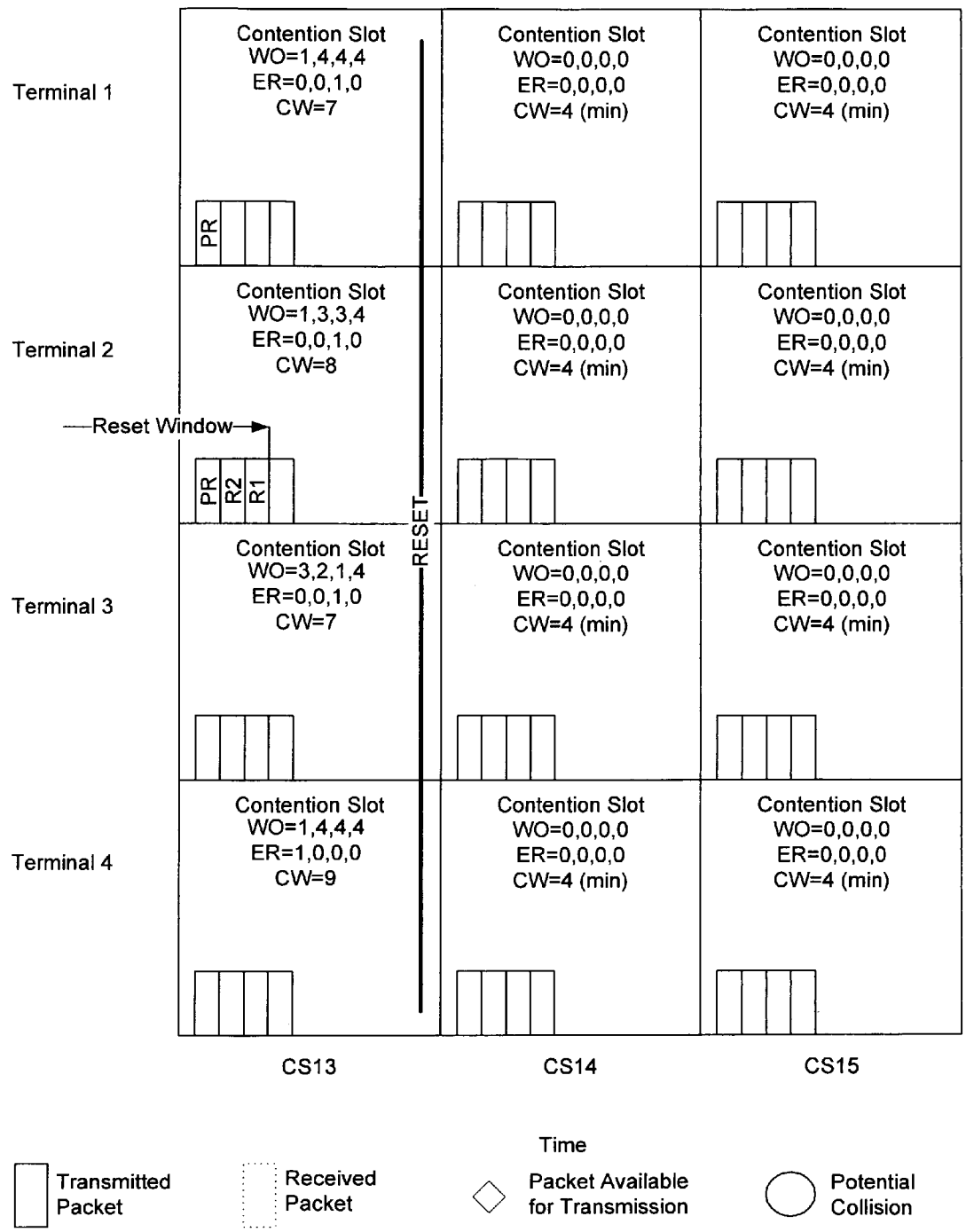
FIG. 14 illustrates three successive contention time slots following the slots in FIG. 13.

FIGS. 13 and 14 also depict a "Reset Window" extending between CS 11 and CS13 for Terminal 2. Preferably, in all terminals a timer is constructed and arranged so that if no activity occurs on the medium, the backoff filter parameters are reset. For example, the timer may count a preset number of COs (excluding priority COs or slots) during which an intervening transmission or error is not detected on the medium. In general, the reset window can be set to any value believed appropriate (e.g., 2-128 are possible values). In a preferred implementation, the reset window is set to the value K*CWmin. In the present example, K=2 and CWmin=4, so the Reset Window would be 8 CO excluding any priority COs.

While the reset window is shown in FIGS. 13-14 for Terminal 2, it preferably exists for all the other terminals as well. The drawing shows that 8 COs (excluding PR COs) are counted over CS11 thru CS13. At the boundary between CS13 and CS14, the values in all backoff filters are cleared to zero, resulting in a new CW of CWmin (or 4).

In addition to the above described control field in each of the packets, it may be desired to add two single bit fields to designate more data pending at the source (MS), and more data pending at the destination (MD). These two bits may be monitored along with the MAC addresses associated with the bits. So, for example, a RTS message may have its MS bit set to indicate that in addition to a current DATA transmission associated with the RTS, an originating terminal has additional packets pending. In a responsive CTS, an additional bit MD may be set to indicate that the responding terminal also has additional packets to send. Further, the CTS may include the MS bit from the original RTS. The following DATA packet would have both the MD and the MS bits set, as would the following ACK (if an ACK is required for the DATA).

Terminals would be responsible for monitoring the MS and the MD bits and the MAC addresses associated with them, and thus could maintain a table of which MAC addresses are actively contending for the medium. If a given address is not heard on the medium for more than a certain time out period (e.g., a number of empty backoff COs equal to twice the value of CW when the given address last transmitted, or CWmax, whichever is smaller), then the information for that address in the table would be deleted. In addition, if a packet is heard from the given address indicating that no more data is present, the address would be deleted from the table. This method is an alternative to the use of WO to determine how many contenders currently exist on the medium. It is more complex, however, and it may not enable an accurate assessment of the number of contenders to be developed as quickly as the use of WO, as well as requiring additional terms to predict how many contenders exist that have not yet announced their presence on the medium. Thus, the WO/ER technique disclosed herein is currently preferred for determining the number of contenders on the medium (and, consequently, the appropriate CW in the contention mechanism).

Figure 15:
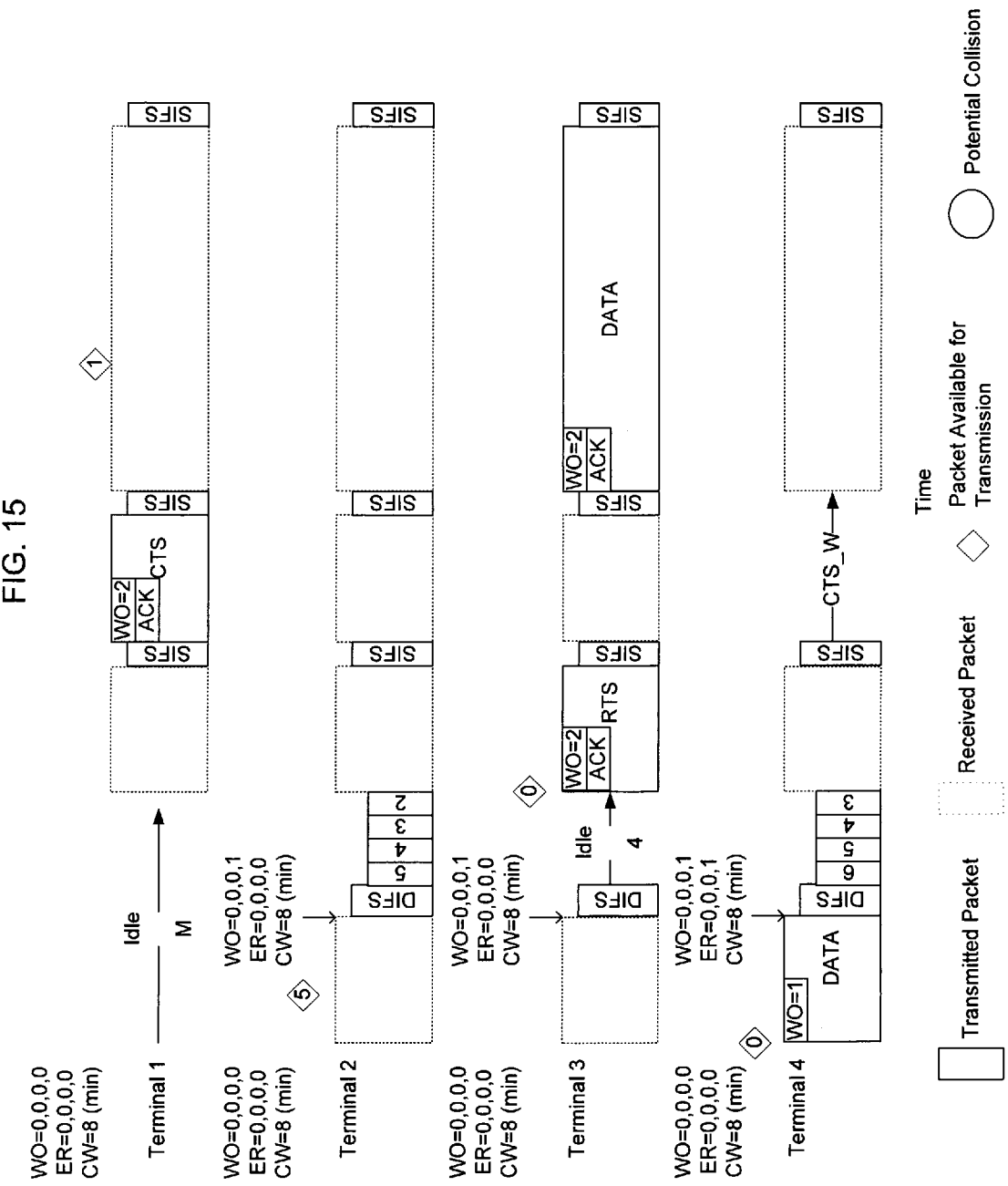
FIG. 15 is a timing diagram illustrating an example of the inventive linear backoff (LB) protocol applied to CSMA/CA medium access.
Figure 16:
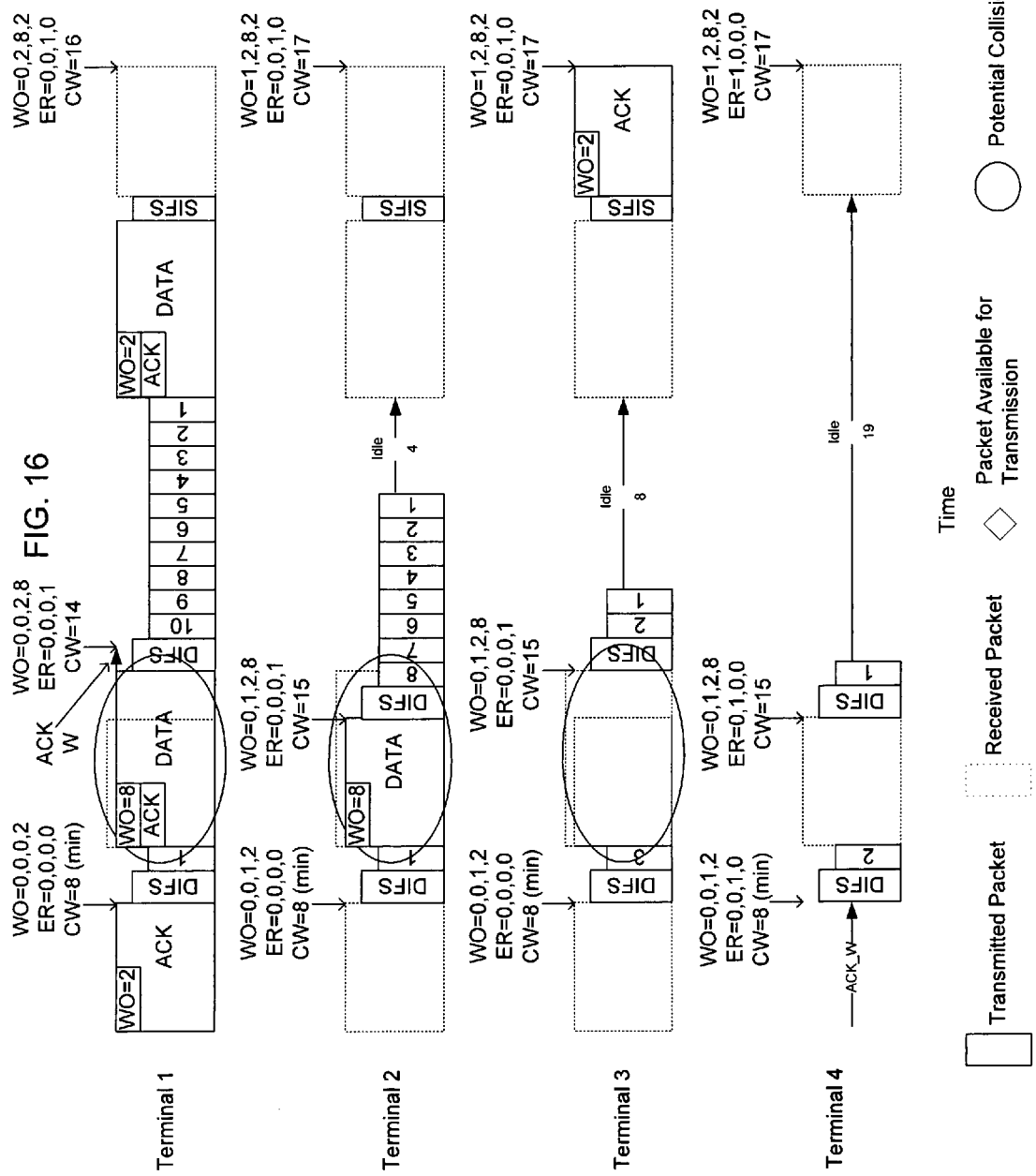
FIG. 16 is a continuation of the timing diagram of FIG. 15.
Figure 17:
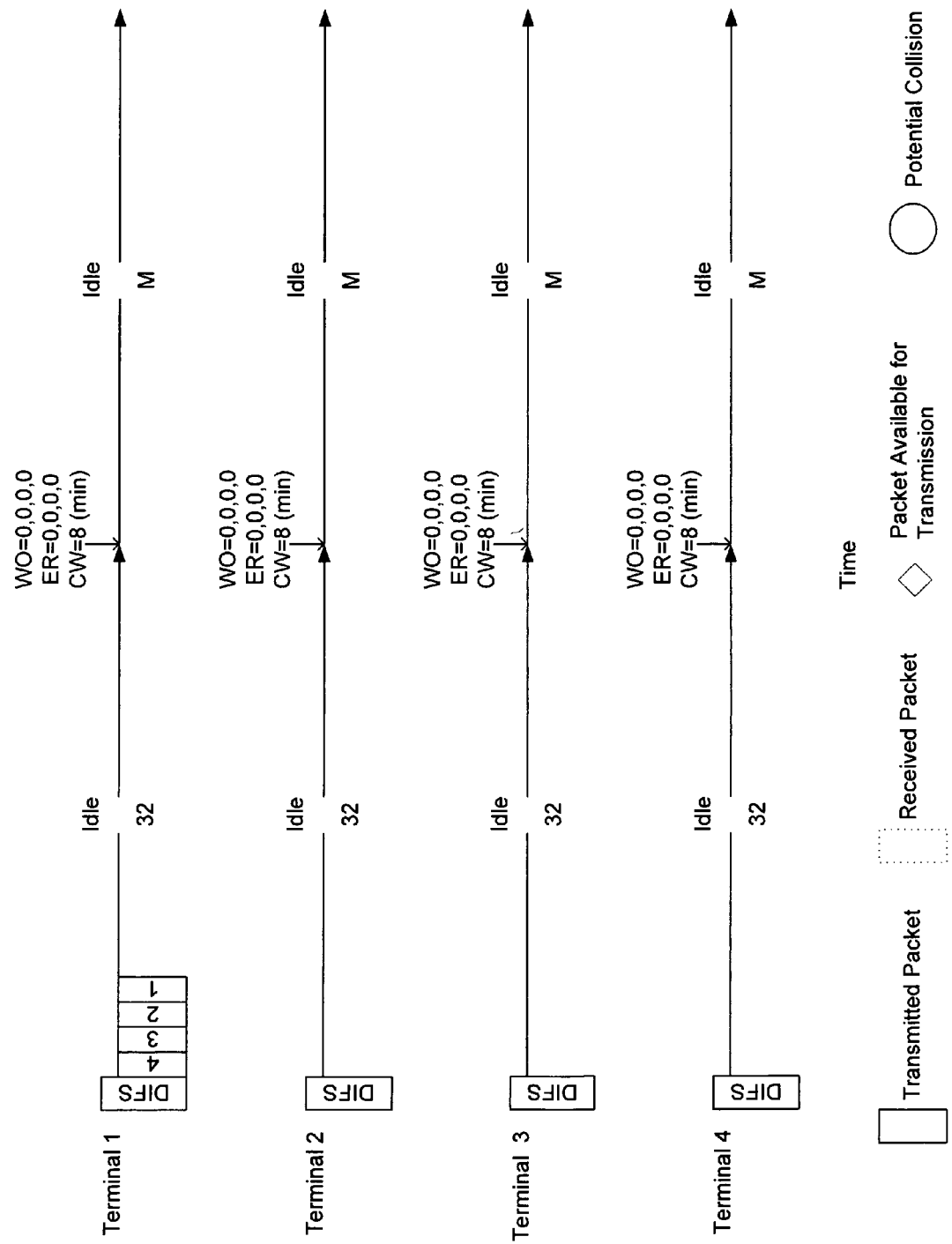
FIG. 17 is a continuation of the timing diagram of FIG. 16.

FIGS. 15 to 17 illustrate an example of the inventive linear backoff (LB) mechanism when applied to traditional S-CSMA such as used in the IEEE 802.11 standard. A transmission scenario corresponding to the one shown in FIGS. 10 to 14 is depicted in FIGS. 15 to 17, except that some backoff values are changed to account for different range delays. S-CSMA normally assumes that all terminals listening during a given backoff slot can detect the start of a transmission within the given slot. This means that the slot must be large enough to account for range delay, detection time, and turn around time (as shown in FIG. 5), so that every terminal is able to determine if a signal is being transmitted within the same backoff slot. This is not always a convenient approach. As inherent medium delays become large, the backoff slots used in S-CSMA also become large and the protocol loses its efficiency. That is why the contention opportunities defined in the inventive SA-CSMA protocol do not depend on an allocation for range delay, and different terminals may detect the presence of a given signal within different COs.

In FIGS. 15 to 17, nomenclature borrowed from the IEEE 802.11 standard is used to make clear how the inventive LB technique may be integrated with that standard, if desired. Specifically, SIFS (Short Inter-Frame Space) roughly corresponds to the Turn Around Time shown in FIG. 5, and DIFS (DCF Inter-Frame Space) is longer and includes slot times that allow for transmissions using SIFS to have priority. Note that the timing in FIGS. 15 to 17 is not necessarily to scale, but otherwise correctly illustrates critical timing relationships. Essentially, the priority (PR) CO or "slot" illustrated in FIGS. 10 to 14 is made part of the DIFS time. The size of the inter-frame space may be varied to establish priority between different access mechanisms (for example, the PCF and the DCF access protocols in IEEE 802.11) or different classes or priorities of packet transmission. In IEEE 802.11 and 802.11e, PIFS, DIFS, and AIFS are different sized inter-frame spaces used to determine priority in those protocols. Persons skilled in the art will appreciate that the inter-frame spaces may likewise be varied in the inventive LB protocol disclosed herein, although only DIFS is shown in the illustrated example.

The size of the inter-frame space may be varied to establish priority between different access mechanisms (for example the PCF and DCF access protocols in IEEE 802.11) or different classes or priorities of packet transmission. In IEEE 802.11 and 802.11e, PIFS, DIFS, and AIFS are different sized inter-frame spaces used to determine priority in IEEE 802.11. As would be obvious to one skilled in the art, all can be practiced with the inventive protocol described here. For this illustrative example, only DIFS is shown. Terminals that transmit or backoff after the DIFS time have skipped the priority slot embedded within the DIFS, while terminals that transmit after SIFS time can be thought of as transmitting in the priority slot.

The backoff parameters used in the S-CSMA example of FIGS. 15 to 17, are closer to corresponding parameters used in the IEEE 802.11 standard than the backoff parameters used in the SA-CSMA example of FIGS. 10 to 14. CWmin is set to 8, while typical values in the 802.11 standard are 16 or 32. The larger values (i.e., 16 or 32) may also be used for CWmin, but they should depend on average packet size on the medium. Currently, a value of 8 is preferred when applying the inventive LB process to S-CSMA in an IEEE 802.11 environment.

CWmax with LB is assumed to be 512, while the corresponding CWmax in the 802.11 standard using BEB would be 1024. Similar larger values could be used with LB but are believed to be excessive for most practical networks. It is assumed that K=4 for S-CSMA, rather than K=2 as in the SA-CSMA examples. This is because it is believed the average packet size would be larger, which normally implies a larger value for K. While larger, the value of K=4 is still small compared to a currently preferred number of K=15 in an IEEE 802.11b environment. The value of K is intentionally kept small for the illustrated example to make it easier to draw. Again, the value of K should be determined by a simulation of typical scenarios, easily undertaken by those skilled in the art. The filter sizes remain at 4 for the illustrated example, but again should be optimized via a simulation.

As in FIG. 10, the scenario in FIG. 15 starts with Terminal 4 receiving a data packet for transmission. The medium has been idle a long time, so the backoff filters at all transmitters are initialized to zero. A diamond in the drawing indicates the arrival of a packet at the corresponding terminal for transmission, and the number in the diamond indicates a randomly selected backoff value. Terminal 4 transmits its data immediately with WO set to 1 since the medium has been idle for some time. It is assumed that IEEE 802.11 networks may be more congested than networks practicing SA-CSMA, so the WO field is preferably 7 bits which allows values of between 0 and 127. Note that since all terminals are assumed to hear the start of all transmissions within the same backoff slot, it is not necessary to transmit the value of CO or its equivalent (backoff slot) within S-CSMA. Since the packets themselves are not slotted, there is no reason to transmit the number of slots that they will occupy (as done in SA-CSMA). Instead, transmissions in the IEEE 802.11 standard include a duration field which serves the same function.

While Terminal 4 is transmitting, a packet arrives at Terminal 2. Since the medium is busy, a backoff is drawn using the current CW value of 8. A backoff value of 5 is selected as indicated in the diamond at the left in FIG. 15 for Terminal 2.

After Terminal 4's transmission completes, all terminals receiving the packet from Terminal 4 update their backoff filters. Note that in the IEEE 802.11 standard (practicing S-CSMA), all terminals synchronize to the end of every packet. By contrast, in the inventive SA-CSMA protocol, the boundaries of the contention slots (CS) are used as synchronization points. When LB is applied to S-CSMA, the filters and the CW values should be updated at the end of each transaction on the medium (always at the end of a packet). In SA-CSMA, the filter and the CW updates occur at the CS boundaries, but the effect is the same in either case. Also note that backoffs with respect to newly arrived packets (when a backoff is not already in progress) are drawn when the packet is queued for transmission in either case, using the CW at that moment.

As in the FIG. 10 to 14 example, assume Terminals 1 and 4 do not hear each other in the example of FIG. 15 to 17. So, Terminal 1 does not react to Terminal 4's packet and does not update its backoff values. Note also that Terminal 1 indicates an "Idle M" medium state. This means that the medium is detected as being idle and that it has been idle for at least M backoff slots, wherein M is a maximum number of backoff slots normally counted. This would correspond to the reset value in SA-CSMA, with a recommended value of CWmin multiplied by K, i.e., 8 times 4, or 32 in this example.

In the IEEE 802.11 standard, there is no explicit ACK bit for some versions. In any event, broadcast and multicast data are not ACK'd, and It is assumed that Terminal 4's data was broadcast (e.g., a Beacon packet) so that no ACK is expected. Accordingly, the ER filter at Terminal 4 is updated with a value of 1.

After updating its ER filter, Terminal 4 must conduct a post-transmission backoff, and selects a random backoff value of 6 based on its current CW of 8. All terminals also wait a DIFS time right after their data transmissions. Terminals 2 and 4 then start their backoff counts, while Terminals 1 and 3 assume an idle state.

During the fourth backoff slot, Terminal 3 receives a data packet for transmission. Since the medium is idle, and Terminal 3 has no existing backoff in progress, it can transmit immediately. The packet is long, and requires an RTS/CTS exchange. Terminal 3 transmits the RTS with its WO field set to 2 (CW of 8 divided by 4 backoff slots since the last transmission). An explicit ACK bit may not be required since, depending on the version of IEEE 802.11 in use, all unicast (single station) addresses require an immediate acknowledgment while all broadcast/multicast transmissions do not. The requirement for acknowledgment can be derived from the address type. But, if desired to simplify processing, a single explicit immediate ACK bit may be added to the IEEE 802.11 protocol in the WO field if LB is incorporated in the protocol.

Upon receiving the RTS message, Terminal 1 waits one SIFS time, and transmits a CTS message. Because a SIFS time is one backoff slot shorter than a DIFS time, the CTS has priority over normal transmissions conducting backoff in the same way CTS establishes priority using the priority (PR) CO in SA-CSMA. Terminal 4 does not hear the CTS but, based on hearing the RTS from Terminal 3, Terminal 4 sets a CTS window CTS_W large enough to cover the expected CTS, a SIFS, and one backoff slot. This ensures that Transmitter 4 will hear the start of Transmitter 3's DATA packet (destined for Transmitter 1) if it is there. Again, a version of the inventive LB protocol may allow post counting of a DIFS and backoff slots if no CTS or start of a DATA packet is heard, but the preferred implementation is not to post count during the CTS window.

Upon receiving the CTS from Terminal 1, Terminal 3 waits only one SIFS time (thus establishing priority over transmissions using DIFS), and transmits its DATA packet. Both of the CTS and the DATA packets maintain the value of WO transmitted in the RTS, and maintain the implied ACK bit (which could be made explicit). During transmission of the DATA packet from Terminal 3, a packet becomes available for transmission at Terminal 1. The current CW at Terminal 1 is 8, and Terminal 1 randomly selects a backoff value of 1.

In FIG. 16, Terminal 1 replies (after waiting a SIFS time) with an ACK to the DATA packet from Terminal 3, maintaining the value of WO at 2. Terminal 4 is unable to hear the ACK, but based on the DATA packet sets an ACK window ACK_W (lower left in FIG. 16) during which Terminal 4 does not transmit or backoff. Upon completion of the packet (and ACK window at Terminal 4), all terminals update their backoff filter values based on the value of WO=2 transmitted during the transaction initiated by Terminal 3, and ER=0 as no errors were detected on the medium. The oldest values in the filter are replaced by the new values. In addition, Terminal 3 randomly draws a backoff value from its newly updated CW (still at a value of 8) for post transmission backoff. Transmitter 3 selects a backoff of 3.

After the ACK from Terminal 1, all terminals wait a DIFS time and then conduct backoff. It happens that both Terminals 1 and 2 have remaining backoffs of 1, so after one backoff slot, they both start to transmit. Both Terminals 1 and 2 compute and transmit a value of 8 for WO (CW=8 divided by backoff of 1). Terminal 1 requires an ACK, while Terminal 2 does not. Potential collisions occur at Terminals 1, 2 and 3, while Terminal 4 receives only the packet from Terminal 2.

After Terminal 2 completes its transmission, it and Transmitter 4 update their backoff filters. Because Transmitter 2 did not require an immediate ACK, it must assume an error during transmission and sets ER=1. Both transmitters compute the following CW:

CW=CEIL($K$*(MAF(WO)+SUM(ER)))

CW=CEIL(4*((0+1+2+8)/4)+(0+0+0+1))

CW=CEIL(4*(2.75+1))=CEIL(15)=15

The positions of the values in the SUM filter are slightly different for the two terminals but the outcome is the same. In addition, Terminal 2 must select a post transmission back off value using a new CW of 15. It draws a random value of 8.

Terminal 4 cannot hear any other transmissions, so after the transmission from Terminal 2 it waits a DIFS time, completes its post transmission backoff, and goes to an idle state. Terminal 2 should be able to hear the ongoing transmission from Terminal 1. In wireless systems, if the beginning of a packet is not heard, the power of the transmission is often insufficient to trigger a threshold to indicate the medium is occupied. Assume this is the case for Terminal 2, which starts timing a DIFS time and initiates backoff even though the transmission from Terminal 1 is ongoing. Terminal 2 then completes its backoff and goes to an Idle state.

Terminal 3 receives transmissions from both Terminal 2 and Terminal 1, but is unable to decipher either. Terminal 3 does receive sufficient power to recognize that the medium is busy through the end of Terminal 1's transmission. After that, it updates its backoff filters. While it cannot read the value of WO from either packet, Terminal 3 can compute a value of WO from its own value of CW, and by monitoring potential backoff slots on the medium. In this case, Terminal 3's most current CW is 8, and it observed one empty backoff slot since the prior transmission. Accordingly, Terminal 3 computes WO=8, and loads the value into the MAF. It also sets ER=1 since the most recent reception was in error, and computes a new CW of 15. Terminal 3 waits a DIFS time, completes its backoff, and goes to the Idle state.

Terminal 1 is expecting an ACK message and sets an ACK window. Note that Terminal 1 sets a smaller ACK window than did Terminal 4. This is because Terminal 1 is the intended receiver of the ACK, and assumes that if the DATA packet is successfully received, then Terminal 1 must be in range to receive the ACK back. The ACK window used is therefore equal to a SIFS and a backoff slot (enough time to detect the presence of the signal), and is actually less than a DIFS time. Since Terminal 1 does not detect a response, it updates it backoff filters using WO=8 as it had transmitted, and ER=1 since no ACK response was detected. It computes a new CW=14, picks a backoff from that CW of 10, waits a DIFS (counting the time it already waited for the ACK window of as part of the DIFS), and then commences backoff. Upon completing backoff, Terminal 1 retransmits the prior packet with an updated value for WO of 2 (i.e., CEIL (CW/Backoff)=CEIL (14/10)=2). This time there is no collision, and the intended receiver (Terminal 3) hears the packets, waits a SIFS time, and responds with an ACK. The ACK includes a value of WO (=2) copied from the DATA packet. Upon completion of the ACK all terminal update their backoff filters, using the value of WO from the ACK since they all heard it, and setting ER=0 since no errors were detected.

In FIG. 17, there are no transmissions. The figure starts with one DIFS time during which each terminal must wait after receiving the ACK. Terminal 1 must still conduct a post transmission backoff. It draws a random backoff of 4, and completes that backoff after the DIFS. Since none of the other terminals have any transmissions or active backoffs, they all assume the Idle state. We see that after all terminals have been idle for a reset window of 32 backoff slots (K*CWmin=8*4=32), they reset their backoff filters to an all zero state, and reset CW to CWmin. Note that Terminal 1 is permitted to count its backoff slots as part of the reset period. The terminals then proceed to the Idle M state (indicating that the medium has been idle for more than the reset window).

While the disclosed example relates to so-called data packets, some versions of IEEE 802.11 (e.g., 802.11e) use a concept of transmission opportunities (TxOP). A TxOP is a period of time during which a series of packets may be transmitted. Rather than contend for individual packet transmissions, terminals may instead contend for TxOPs, and transmit a set of packets without contention within a given TxOP. Persons skilled in the art will recognize that the protocols disclosed herein may be used for contention of TxOPs rather than packets, simply by substituting TxOPs for packets where ever packets are referred to in the protocols.

In addition, some versions of the IEEE 802.11 protocol include classes of service or access categories (AC) for different types of packets. Each AC acts as a virtual station contending for the medium with other terminals, but also with other AC at the same terminal. For example, there may be four ACs available, corresponding to background traffic (BK), best effort traffic (BE), video traffic (VI) and voice traffic (VO), each using a different length arbitration inter-frame space (AIFS), CWmin, and CWmax. (For an example of how these parameters may be configured, see pages 1019 to 1029 of IEEE 802.11-2007). Note that AIFS is similar to PIFS and DIFS except it can have different sizes for different classes of packets, thus helping to differentiate among various levels of QoS. All AC practice the same contention and backoff mechanisms, however. Persons skilled in the art will therefore recognize that the inventive protocols may still be applied for backoff and channel access in cases where each AC acts as an independent terminal.

In an extension to the AC concept, each AC may also use a different value of K in its implementation of the LB protocol. Some AC (such as for VO) might be restricted to shorter packets having higher priority, and, hence, a smaller value of K would be appropriate. An example mapping of K would be; for BK, use K=20; for BE, use K=15; for VI, use K=10, and for VO, use K=5. While these are currently preferred values of K for the LB protocol when applied with AC in an IEEE 802.11b or 802.11g environment, optimal values may also be determined by known simulation techniques.

While the LB process described herein may be practiced with the disclosed SA-CSMA protocol as well as with standard S-CSMA (such as IEEE 802.11) protocols, the preferred implementation for LB is with SA-CSMA. Similarly, while SA-CSMA may be practiced with a variety of backoff mechanisms (such as LB or BEB) and acknowledgment methodologies, a preferred implementation for SA-CSMA is with LB and the acknowledgment policies illustrated in this application. Further, the preferred implementation for SA-CSMA with LB may be applied within so-called contention zones of a frame structure such as described in pending PCT Patent Application No. PCT/US/2007014386 entitled Supporting Mobile Ad-hoc Network (MANET) and Point to Multi-point (PMP) Communications Among Nodes in a Wireless Network and which is assigned to the assignee of the present application and invention. All relevant portions of the mentioned PCT application are incorporated by reference. Also, certain parameters for such an implementation (including access methodology, modulation, bandwidths, coding, and the like) may be as described in the cited application.

Those skilled in the art will understand that the sizes of the contention opportunities CO and the contention slots CS, as well as the number of CO in each CS, may each be tailored to suit various networking environments in which the inventive SA-CSMA protocols may be carried out. One preferred value for the size of each CS is about 5 OFDM symbols, presuming OFDM modulation as described in the mentioned PCT application. Also, a preferred implementation would use four COs per contention slot, wherein the first is a priority (PR) CO and the next three COs are used as backoff COs according to the invention. The size of the priority CO may correspond to about one-half an OFDM symbol, and the size of the backoff COs may correspond to about one-quarter an OFDM symbol each.

While the foregoing represents preferred embodiments of the invention, it will be understood by those skilled in the art that various modifications and changes may be made without departing from the spirit and scope of the invention, and that the invention includes all such modifications and changes as are within the bounds of the following claims.

We claim:

1. A method of controlling wireless medium access in a communication network having a number of terminals, comprising:
    defining one or more protocol message units for transmission by a given terminal which units correspond to an operational state of at least one of the terminal or the medium;
    defining a minimum packet size that is at least the size of a smallest one of the protocol message units;
    allocating a number of time slots for transmission of packets from the terminals, including defining each time slot to be of sufficient duration to contain the defined minimum packet size;
    allocating within each time slot certain time periods corresponding to a number of contention opportunities; and
    applying, at a given terminal and during the contention opportunities of each of the time slots, certain priority and backoff mechanisms so that packets are transmitted by the terminal within the time slots while (1) minimizing the occurrence of empty time slots during periods when packets are available at the terminal for transmission, and (2) minimizing the number of time slots during which two or more transmitted packets are detected simultaneously at the given terminal.

2. A method of controlling medium access according to claim 1, including allocating a time period for transmission of data packets within each time slot and following the contention opportunities.

3. A method of controlling medium access according to claim 1, including allocating a time period for transmission of control packets within each time slot and following the contention opportunities.

4. A method of controlling medium access according to claim 1, including allocating within each time slot and following the contention opportunities, a time period corresponding to a determined range delay.

5. A method of controlling medium access according to claim 1, including allocating the contention opportunities contiguous with one another within each of the time slots.

6. A method of controlling medium access according to claim 1, including defining the protocol message units as at least one of a request-to-send (RTS) message, a clear-to-send (CTS) message, and an acknowledgment (ACK) message.

7. A method of controlling medium access according to claim 6, including appending a fragment of a data message to an RTS message within a given time slot, thereby using otherwise unoccupied time allotted for data transmission within the slot.

8. A method of controlling medium access according to claim 1, including defining the duration of each of the time slots to correspond to about five OFDM symbols.

9. A method of controlling medium access according to claim 1, including allocating four or more contention opportunities in each of the time slots.

10. A method of controlling medium access according to claim 1, including defining a first contention opportunity in each time slot as a priority (PR) contention opportunity for control and priority transmissions.

11. A method of controlling medium access according to claim 10, including defining the duration of the PR contention opportunity to correspond to about one-half of an OFDM symbol, and defining the duration of each following contention opportunity in the time slot to correspond to about one-quarter of an OFDM symbol.

12. A method of controlling medium access according to claim 1, including conducting a backoff procedure at a given terminal by;
    defining a contention window (CW);
    counting a number of contention opportunities between packets transmitted on the medium and detected at the terminal;
    estimating a window occupancy (WO) value as a function of the CW and the counted contention opportunities;
    detecting each transmission error (ER) that occurs on the medium;
    modifying the CW according to current values of WO and ER; and
    randomly selecting from the modified CW a backoff value corresponding to a number of unoccupied contention opportunities which the terminal must detect prior to transmitting available data.

13. A method of controlling medium access according to claim 12, including defining a first contention opportunity in each time slot as a priority (PR) contention opportunity for control and priority transmissions, and excluding PR contention opportunities from the counting step.

14. A method of controlling medium access according to claim 12, wherein the modifying step includes computing CW according to $$CW=CEIL(K*(MAF(WO)+SUM(ER)))\ \text{wherein}$$

K is a determined constant,
MAF is a current value of a moving average filter containing a certain number of most recent values of WO;
SUM is a current value of a summation filter containing a certain number of most recent detected transmission ERs; and
CEIL is the smallest integer that is larger than the value on which it operates.

15. A method of controlling medium access according to claim 14, including arranging the moving average filter to have a size of four.

16. A method of controlling medium access according to claim 14, including arranging the summation filter to have a size of four.

17. A method of controlling medium access according to claim 12, including embedding control fields in packets transmitted by a given terminal, and providing in the control fields at least one of (i) a WO field corresponding to a current value of WO at the given terminal, (ii) a CO field corresponding to the contention opportunity in which the given terminal began transmission of the associated packet, (iii) a CS field indicating a number of time slots occupied by the packet, and (iv) an ACK field indicating that an acknowledgment of the packet is required by the given terminal.

18. A method of controlling wireless medium access in a S-CSMA protocol network having a number of terminals, including conducting a backoff procedure at a given terminal by;
defining a contention window (CW);
counting a number of backoff slots between packets transmitted on the medium and detected at the terminal;
estimating a window occupancy (WO) value as a function of the CW and the counted backoff slots;
detecting each transmission error (ER) that occurs on the medium;
modifying the CW according to current values of WO and ER; and
randomly selecting from the modified CW a backoff value corresponding to a number of contention opportunities over which the terminal backs off prior to transmitting available data.

19. The method of claim 18, including arranging the terminals of the network to contend for transmission opportunities on the medium.

20. A method of controlling medium access according to claim 18, including defining priority (PR) slots of varying sizes, and excluding from the backoff slot counting step those PR slots that occur after each packet transmission.

21. The method of claim 20, including using the PR slots to establish priority between access mechanisms including a point coordination function and a distributed coordination function.

22. The method of claim 20, including using the PR slots to establish priority between access categories including background, best effort, video, and voice.

23. The method of claim 22, including arranging terminals of the network to contend for transmission opportunities on the medium.

24. A method of controlling medium access according to claim 20, wherein the modifying step includes computing CW according to $$CW = CEIL(K * (MAF(WO) + SUM(ER)))$$ wherein K is a determined constant,
MAF is a current value of a moving average filter containing a certain number of most recent values of WO;
SUM is a current value of a summation filter containing a certain number of most recent detected transmission ERs; and
CEIL is the smallest integer that is larger than the value on which it operates.

25. A method of controlling medium access according to claim 24, including embedding control fields in packets transmitted by a given terminal, and providing in the control fields at least one of (i) a WO field corresponding to a current value of WO at the terminal, and (ii) an ACK field indicating that an acknowledgment of the packet is required by the terminal.

* * * * *